US012565202B2

(12) United States Patent
Shen et al.

(10) Patent No.: US 12,565,202 B2
(45) Date of Patent: Mar. 3, 2026

(54) INTELLIGENT DRIVING METHOD AND VEHICLE TO WHICH METHOD IS APPLIED

(71) Applicant: SHENZHEN YINWANG INTELLIGENT TECHNOLOGIES CO., LTD., Shenzhen (CN)

(72) Inventors: Chen Shen, Shenzhen (CN); Xiang Wang, Shanghai (CN); Liangfan Zhu, Shanghai (CN); Zhengchen Dai, Shanghai (CN); Mingbo Du, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 182 days.

(21) Appl. No.: 18/665,167

(22) Filed: May 15, 2024

(65) Prior Publication Data

US 2024/0300489 A1     Sep. 12, 2024

Related U.S. Application Data

(63) Continuation of application No. PCT/CN2021/131017, filed on Nov. 16, 2021.

(51) Int. Cl.
B60W 30/095 (2012.01)

(52) U.S. Cl.
CPC ..... B60W 30/0956 (2013.01); B60W 2520/10 (2013.01); B60W 2554/4041 (2020.02); B60W 2554/802 (2020.02)

(58) Field of Classification Search
CPC .............. B60W 30/09; B60W 30/095; B60W 30/0953; B60W 60/0011; B60W 60/00274; B60W 60/00276
See application file for complete search history.

(56) References Cited

U.S. PATENT DOCUMENTS 9,248,834 B1 *   2/2016   Ferguson ..............  B60W 30/09
2019/0367022 A1 * 12/2019  Zhao .................  B60W 30/0956
(Continued)

FOREIGN PATENT DOCUMENTS

CN       110297494 A     10/2019
CN       110298131 A     10/2019
(Continued)

OTHER PUBLICATIONS

International Search Report and Written Opinion in International Appln. No. PCT/CN2021/131017, mailed on May 27, 2022, 18 pages (with English translation).
(Continued)

*Primary Examiner* — Anshul Sood
(74) *Attorney, Agent, or Firm* — Fish & Richardson P.C.

(57)     ABSTRACT

This application discloses example intelligent driving methods and vehicles to which the example methods are applied. In one example method, a decision solution set of an ego vehicle may be obtained based on perception information, and a first decision solution used for a first interaction phase between the ego vehicle and a game target is obtained from the decision solution set. While controlling the ego vehicle to travel based on the first decision solution, a determination is made that the ego vehicle and the game target meet a condition for entering a second interaction phase. A second decision solution used for the second interaction phase between the ego vehicle and the game target is obtained from the decision solution set, and the ego vehicle is controlled to travel based on the second decision solution.

20 Claims, 15 Drawing Sheets

(56)    References Cited

U.S. PATENT DOCUMENTS

| | | | |
|---|---|---|---|
| 2020/0298842 A1* | 9/2020 | Takamatsu | B60W 30/09 |
| 2021/0053561 A1* | 2/2021 | Beller | G08G 1/166 |
| 2021/0188317 A1 | 6/2021 | Xia et al. | |
| 2021/0300412 A1 | 9/2021 | Dingli et al. | |
| 2022/0379918 A1* | 12/2022 | Osawa | B60W 60/00274 |

FOREIGN PATENT DOCUMENTS

| | | | |
|---|---|---|---|
| CN | 112373485 A | 2/2021 |
| JP | 2008191781 A | 8/2008 |
| JP | 2019151309 A | 9/2019 |
| JP | 2020104649 A | 7/2020 |
| JP | 2020154492 A | 9/2020 |
| WO | 2018134941 A1 | 7/2018 |

OTHER PUBLICATIONS

Office Action in Japanese Appln. No. 2024-529236, mailed on Jun. 20, 2025, 12 pages (with English translation).
Extended European Search Report in European Appln. No. 21964323.6, mailed on Nov. 26, 2024, 8 pages.
Office Action in Japanese Appln. No. 2024-529236, mailed on Oct. 28, 2025, 14 pages (with English translation).

* cited by examiner

Safety cost (a)

Comfort cost (b)

Passability cost (c)

Right-of-way cost (d)

Passability cost (e)

Inter-frame association cost (cost)

(f)

INTELLIGENT DRIVING METHOD AND VEHICLE TO WHICH METHOD IS APPLIED

CROSS-REFERENCE TO RELATED APPLICATIONS

This application is a continuation of International Application No. PCT/CN2021/131017, filed on Nov. 16, 2021, the disclosure of which is hereby incorporated by reference in its entirety.

TECHNICAL FIELD

This application relates to the field of vehicle technologies, furthermore, to an intelligent driving method and a vehicle to which the method is applied.

BACKGROUND

In the field of autonomous driving, a case in which an ego vehicle interacts with another vehicle in a traveling process is often encountered. Currently, for a scenario in which an ego vehicle interacts with another vehicle, a mainstream decision method is mainly that the ego vehicle obtains a decision solution based on a predicted track of the another vehicle, and travels based on the decision solution.

In an actual case, it is assumed that, as shown in (a) in FIG. 1, another vehicle is in a state of waiting to turn left, and an ego vehicle is in a state of going straight. According to a customary rule of turning left after yielding to straight-through vehicles, the ego vehicle predicts that the another vehicle will yield to the ego vehicle. Based on the predicted track for the another vehicle that is obtained by the ego vehicle, an obtained decision solution may be that the ego vehicle accelerates and passes quickly. However, in an actual interaction process, as shown in (b) in FIG. 1, a future behavior of the another vehicle does not necessarily yield based on the predicted track. If the ego vehicle still travels according to the previously obtained decision solution, a probability that the ego vehicle collides with or scratches the another vehicle is relatively high, and a probability that the ego vehicle passes safely is relatively low. In addition, when the ego vehicle is to collide with the another vehicle, the ego vehicle or the driver may brake urgently (for example, the ego vehicle starts an AEB (autonomous emergency braking) function to avoid collision), which causes poor ride experience. Further, because a prediction result of the ego vehicle may not match an actual situation, even in a same scenario, a different result may be obtained. Therefore, generalization of an autonomous driving control policy is relatively poor.

In conclusion, a method is required to improve interaction safety, driving and riding comfort, and generalization of the control policy of autonomous driving.

SUMMARY

This application provides an intelligent driving method and a vehicle to which the method is applied, to improve interaction safety, driving and riding comfort, and generalization of a control policy of vehicle autonomous driving.

The intelligent driving method provided in this application may be performed by an electronic apparatus. The electronic apparatus may be abstracted as a computer system. The electronic apparatus may be an entire system, or may be a part of components in an entire system, for example, a system chip or a processing chip.

In some embodiments, the electronic apparatus may be a terminal apparatus or a vehicle-mounted device such as an in-vehicle computer or an in-vehicle infotainment in a vehicle, or may be a system chip, a decision processing chip, a chip of another type, or the like that can be disposed in a computer system in a vehicle or a vehicle-mounted device.

According to a first aspect, an embodiment of this application provides an intelligent driving method, including:

obtaining a decision solution set of an ego vehicle based on perception information; obtaining, from the decision solution set, a first decision solution used for a first interaction phase between the ego vehicle and a game target; in a process of controlling, based on the first decision solution, the ego vehicle to travel, detecting that the ego vehicle and the game target meet a condition for entering a second interaction phase; obtaining, from the decision solution set, a second decision solution used for a second interaction phase between the ego vehicle and the game target; and controlling, based on the second decision solution, the ego vehicle to travel.

The perception information may be obtained based on an in-vehicle perception apparatus of the vehicle. The in-vehicle perception apparatus may include but is not limited to, for example, a lidar, a millimeter-wave radar, an ultrasonic radar, or a camera. The perception information may also be obtained in a manner such as V2X (Vehicle to Everything), V2V (Vehicle to Vehicle), or V2I (Vehicle to Infrastructure).

The first interaction phase is a phase in which an interaction relationship between the ego vehicle and the game target is unclear, and the second interaction phase is a phase in which an interaction phase between the ego vehicle and the game target is clear.

For example, when the foregoing method is performed by an electronic apparatus, the perception information may be obtained by using a collection apparatus in the electronic apparatus, and the collection apparatus may send the perception information to a processing apparatus in the electronic apparatus by using an interface circuit connected to the processing apparatus; or the perception information may be obtained by using a collection apparatus externally connected to the electronic apparatus, and the collection apparatus may send the perception information to the processing apparatus in the electronic apparatus in a wired or wireless connection manner. The processing apparatus may obtain the decision solution set of the ego vehicle based on the perception information; then obtain, from the decision solution set, the first decision solution used for the first interaction phase between the ego vehicle and the game target; in the process of controlling, based on the first decision solution, the ego vehicle to travel, detect that the ego vehicle and the game target meet the condition for entering the second interaction phase; obtain, from the decision solution set, the second decision solution used for the second interaction phase between the ego vehicle and the game target; and control, based on the second decision solution, the ego vehicle to travel.

According to the method in this application, in a vehicle decision process, the decision process is divided into a plurality of interaction phases, the game target is continuously tracked and perceived, and an interaction phase of the vehicle is continuously updated, so that dynamic vehicle decision is implemented, a problem that a decision result is inconsistent with an actual action of the game target can be effectively handled, an autonomous driving takeover rate is reduced, and a generalization capability of game decision is enhanced. In addition, because the decision process includes a plurality of interaction phases, the vehicle progresses gradually throughout the decision process, thereby effectively reducing abrupt acceleration and abrupt deceleration and improving comfort of autonomous driving.

In a possible design, the first interaction phase in this application may be understood as a critical state. The critical state may be understood as that an interaction relationship between the ego vehicle and the game target is unclear. That the interaction relationship is unclear may be understood as that benefits of a plurality of decision solutions for interaction between the ego vehicle and the game target are not greatly different, that is, the decision solution of the ego vehicle may change at any time, that is, jump from a decision solution A to a decision solution B.

When the ego vehicle and the game target are in the critical state, the ego vehicle continuously tracks a status of the game target in a process of traveling by using the first decision solution, which may be understood as step-by-step viewing, and the decision solution may be adjusted at any time.

In a possible design, the second interaction phase in this application may be understood as a confidence state. The confidence state may be understood as that an interaction relationship between the ego vehicle and the game target is clear. That the interaction relationship is clear may be understood as that a decision solution for interaction between the ego vehicle and the game target is determined.

For example, in a game process of the ego vehicle and the game target, as the game process continues, the ego vehicle approaches a better decision solution. When a difference between the better decision solution and another decision solution is large enough (the difference may be generally determined by using a benefit difference between different decision solutions), it is considered that the game relationship is clear, and the transition from the critical state to the confidence state is completed.

In a possible design, in a process in which the ego vehicle performs the first interaction phase with the game target, the status of the game target is continuously tracked.

In a possible design, the condition for entering the second interaction phase includes one of the following: duration of the first interaction phase exceeds threshold duration; a decision benefit difference between a decision solution with the first highest decision benefit in the decision solution set and a decision solution with the second highest decision benefit is not less than a threshold benefit difference; an actual moving track of the game target at a predetermined moment is inconsistent with the first decision solution; an actual moving track of the game target at a predetermined moment is consistent with the first decision solution; or a distance between the ego vehicle and the game target is less than a threshold distance.

According to the method, in a vehicle decision process, a plurality of conditions for determining to enter the second interaction phase are provided, which is more flexible and more adaptive.

In a possible design, at least one target is determined based on the perception information, and a future moving track of the at least one target is obtained; and a target, in the at least one target, whose future moving track intersects a future moving track of the ego vehicle is determined as the game target.

For example, when the foregoing method is performed by an electronic apparatus, the perception information may be obtained by using a collection apparatus in the electronic apparatus, and the collection apparatus may send the perception information to a processing apparatus in the electronic apparatus by using an interface circuit connected to the processing apparatus; or the perception information may be obtained by using a collection apparatus externally connected to the electronic apparatus, and the collection apparatus may send the perception information to the processing apparatus in the electronic apparatus in a wired or wireless connection manner. The processing apparatus may determine the at least one target based on the perception information, and determine the game target from the at least one target.

By using this method, in a vehicle decision process, a scheme for determining a game target is provided, and the adaptability is stronger.

In a possible design, lateral position offset sampling dimensions and longitudinal acceleration sampling dimensions of the ego vehicle and the game target are obtained based on the perception information; and the decision solution set is obtained based on the lateral position offset sampling dimensions and the longitudinal acceleration sampling dimensions.

For example, when the foregoing method is executed by the electronic apparatus, the processing apparatus in the electronic apparatus may obtain the lateral position offset sampling dimensions and the longitudinal acceleration sampling dimensions of the ego vehicle and the game target based on the perception information; and then, the processing apparatus in the electronic apparatus obtains the decision solution set based on the lateral position offset sampling dimensions and the longitudinal acceleration sampling dimensions.

In a possible design, the lateral position offset sampling dimensions of the ego vehicle and the game target are obtained based on the perception information and a first factor; and the longitudinal acceleration sampling dimensions of the ego vehicle and the game target are obtained based on the perception information and a second factor, where the first factor includes at least one of a road boundary and a static obstacle in an environment in which the ego vehicle is located, and the second factor includes at least one of a road speed limit in the environment in which the ego vehicle is located, an acceleration change rate, and a game target type.

For example, when the foregoing method is executed by the electronic apparatus, the processing apparatus in the electronic apparatus may obtain the lateral position offset sampling dimensions of the ego vehicle and the game target based on the perception information and the first factor; and the processing apparatus in the electronic apparatus may obtain the longitudinal acceleration sampling dimensions of the ego vehicle and the game target based on the perception information and the second factor.

According to the method, in a vehicle decision process, a method for determining a lateral position offset sampling dimension and a longitudinal acceleration sampling dimension is provided.

In a possible design, at least one decision solution subset is obtained by dividing the decision solution set, where each decision solution subset includes at least one decision solution; an optimal decision solution corresponding to each decision solution subset is determined, where the optimal decision solution is a decision solution with a highest decision benefit in the corresponding decision solution subset; and the first decision solution used for the first interaction phase between the ego vehicle and the game target is obtained from at least one optimal decision solution.

According to the method, in a vehicle decision process, a method for selecting the first decision solution is provided. The first decision solution is selected from optimal decision solutions corresponding to different decision solution subsets, so that the selected first decision solution can be more practical, and interaction safety and a pass rate can be improved.

In a possible design, a target decision solution whose decision benefit is not less than a threshold benefit in the at least one optimal decision solution is classified into a first echelon, and an optimal decision solution whose decision benefit is less than the threshold benefit is classified into a second echelon. In other words, a decision solution subset whose decision benefit is greater than the threshold benefit (each decision solution subset is "represented" by an optimal decision solution corresponding to the decision solution subset) is determined as the first echelon, and a decision solution subset whose decision benefit is less than the threshold benefit is determined as the second echelon. The first decision solution used for the first interaction phase between the ego vehicle and the game target is determined from the optimal decision solution included in the first echelon.

According to the method, in a vehicle decision process, a method for selecting the first decision solution is further provided. The decision solutions are divided more refinedly based on the benefit thresholds, to obtain the first echelon with a relatively high decision benefit, and then the first decision solution is determined from the optimal decision solution included in the first echelon. This enhances applicability of the first decision solution more effectively, and better improves interaction safety and a pass rate. In a possible design, the second decision solution used for the second interaction phase between the ego vehicle and the game target is obtained from the target decision solution included in the first echelon.

In a possible design, a decision benefit corresponding to each decision solution in the decision solution subset is determined based on a benefit evaluation system; and a decision solution with a highest decision benefit in the decision solution subset is determined as a target decision solution corresponding to the decision solution subset. The benefit evaluation system includes at least one dimension of safety, comfort, passability, a right of way, a risk area, and an offset of a decision solution.

For example, when the foregoing method is executed by the electronic apparatus, the processing apparatus in the electronic apparatus may determine, according to the benefit evaluation system, the decision benefit corresponding to each decision solution in the decision solution subset.

By using the method, a method for determining a decision benefit of a decision solution is provided in a vehicle decision process.

In a possible design, the benefit evaluation system used for interaction is determined based on a correspondence between a traveling environment and a benefit evaluation system; and the decision benefit corresponding to each decision solution in the decision solution subset is determined according to the benefit evaluation system used for interaction.

According to the method, this application provides the correspondence between a traveling environment and a benefit evaluation system, so that a more suitable benefit evaluation system can be selected in a vehicle decision process with reference to a current traveling environment of the vehicle, so that an obtained decision benefit of a decision solution is more realistic, more targeted, and more authentic and effective.

In a possible design, before the first decision solution used for the first interaction phase with the game target is determined from the decision solution set, it is determined that the ego vehicle and the game target meet a condition for entering the first interaction phase, where the condition for entering the first interaction phase includes that a difference between decision benefits of any two target decision solutions in the first echelon is less than a threshold benefit difference.

According to the method, a condition for entering the first interaction phase is provided in a vehicle decision process.

In a possible design, the method further includes: if a difference between a decision benefit of a target decision solution in the first echelon and a decision benefit of each remaining target decision solution in the first echelon is greater than a threshold benefit difference, determining to perform the second phase.

In a possible design, each decision solution includes one action pair group, and the action pair group includes a vehicle speed and a vehicle offset direction.

In a possible design, the method further includes: adjusting a decision solution used in the first interaction phase when determining, in the first interaction phase, that a tracking result of the game target at a predetermined moment is inconsistent with a moving track at the predetermined moment that is predicted by using the first decision solution.

It may be understood that the decision solution used for interaction is not clear in the first interaction phase. Therefore, in a process in which the ego vehicle travels by using the first decision solution, the ego vehicle may continuously track a status of the game target, and continuously adjust the decision solution.

In a possible design, the first decision solution is the same as the second decision solution.

For example, the ego vehicle uses a decision solution a in the first interaction solution. Then, when it is determined that a decision benefit of the decision solution a is the highest, and a decision benefit difference between the decision solution a and a decision solution b with the second highest decision benefit is greater than a threshold benefit difference, the ego vehicle determines that the first interaction phase needs to be switched to the second interaction phase, and the ego vehicle switches to the second interaction phase, and uses the decision solution a to travel.

According to a second aspect, this application provides a computing device, including a processor. The processor is connected to a memory, the memory stores a computer program or instructions, and the processor is configured to execute the computer program or the instructions stored in the memory, so that the computing device performs the method in any possible implementation of the first aspect.

According to a third aspect, this application provides a computer-readable storage medium, storing a computer program or instructions. When the computer program or the instructions are executed, a computer is enabled to perform the method in any possible implementation of the first aspect.

According to a fourth aspect, this application provides a computer program product. When a computer executes the computer program product, the computer is enabled to perform the method in any possible implementation of the first aspect.

According to a fifth aspect, this application provides a chip. The chip is connected to a memory, and is configured to read and execute a computer program or instructions stored in the memory, to implement the method in any possible implementation of the first aspect.

According to a sixth aspect, this application provides a vehicle. The vehicle includes an in-vehicle perception apparatus and an execution apparatus, to implement the method in any one of the first aspect or the possible implementations of the first aspect.

According to a seventh aspect, this application provides a vehicle. The vehicle includes the chip in the fifth aspect and the execution apparatus, to implement the method in any possible implementation of the first aspect.

According to an eighth aspect, this application provides a vehicle. The vehicle includes a perception module, configured to obtain perception information. The vehicle further includes a processing module, configured to: obtain a decision solution set of an ego vehicle based on the perception information; obtain, from the decision solution set, a first decision solution used for a first interaction phase between the ego vehicle and a game target; in a process of controlling, based on the first decision solution, the ego vehicle to travel, detect that the ego vehicle and the game target meet a condition for entering a second interaction phase; obtain, from the decision solution set, a second decision solution used for a second interaction phase between the ego vehicle and the game target; and control, based on the second decision solution, the ego vehicle to travel.

It should be understood that the technical solutions provided in this application may be applied to products such as a mass production autonomous driving vehicle and a mobile robot, so as to implement dynamic decision for an interactive game between the product and a plurality of obstacles (game targets), provide a more applicable and reasonable decision solution, effectively handle a problem that a decision result is inconsistent with an actual action of a game target, improve autonomous driving safety, and enhance a generalization capability of an autonomous driving control policy, so that interaction with a plurality of obstacles (game targets) in a complex scenario is better completed. In addition, when the technical solutions are applied to an autonomous driving scenario, because a decision process may include a plurality of interaction phases, the vehicle progresses gradually throughout the decision process, thereby effectively reducing abrupt acceleration and abrupt deceleration and improving comfort of autonomous driving.

DESCRIPTION OF EMBODIMENTS

Figure 1:
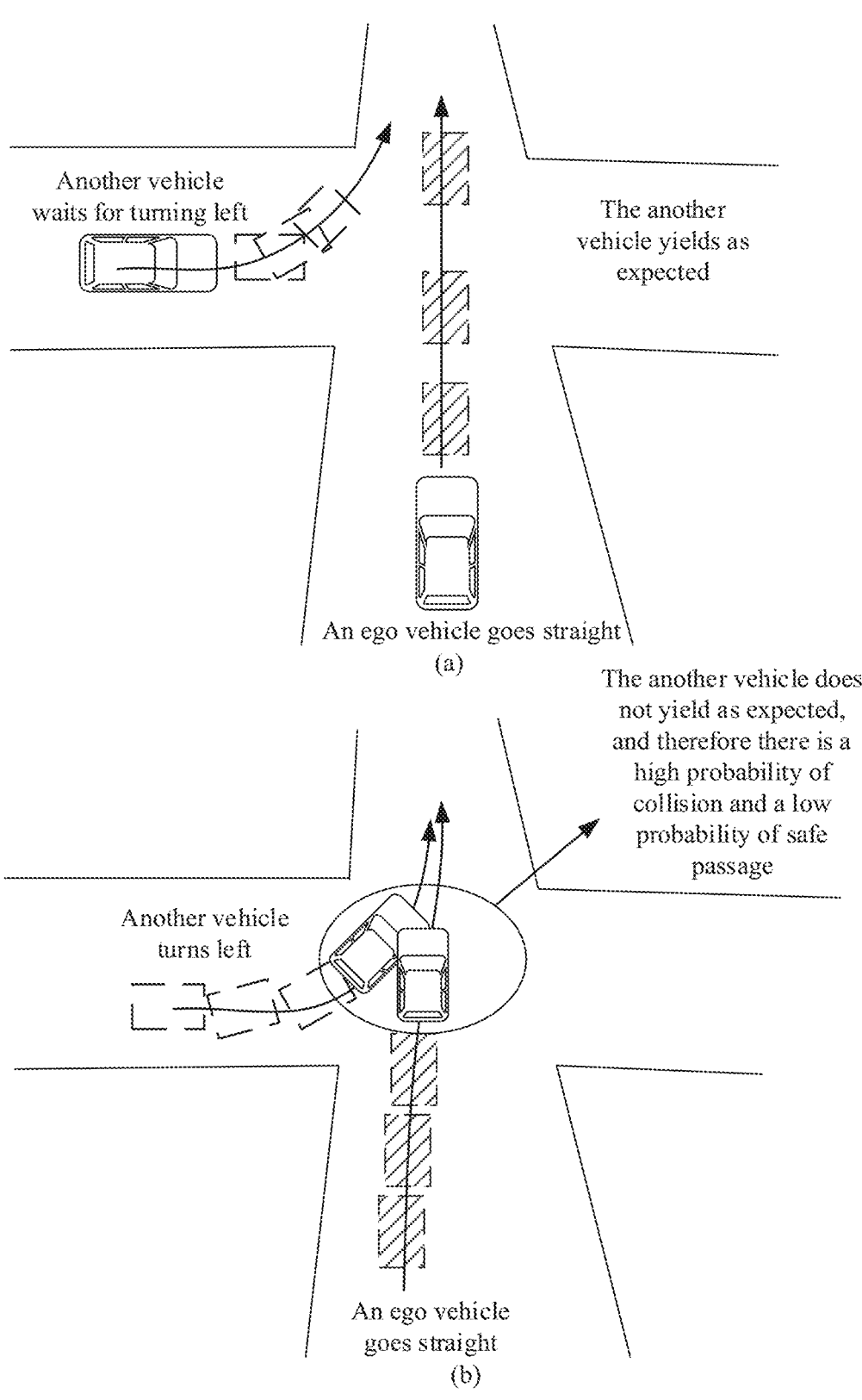
FIG. 1 is a schematic diagram of a vehicle decision scenario.

This application provides an intelligent driving method and a vehicle to which the method is applied. Furthermore, the intelligent driving method may be used in a vehicle decision process, so that the vehicle has a good capability of interacting with a surrounding obstacle in an autonomous driving process.

According to the method provided in embodiments of this application, in a vehicle decision process, a difference between an actual moving track of a game target (for example, a game vehicle) and a predicted moving track is considered, and an interaction process between an ego vehicle and the game target is divided into a plurality of game phases, to implement dynamic vehicle decision, so that a problem that a decision result is inconsistent with the actual moving track of the game target can be effectively handled, thereby reducing an autonomous driving takeover rate and an accident probability, improving safety and comfort of autonomous driving, and enhancing a generalization capability of game decision.

An electronic apparatus in embodiments of this application may be used to support a vehicle in implementing the intelligent driving method provided in embodiments of this application.

In some embodiments, the electronic apparatus in embodiments of this application may be a vehicle-mounted device or the like.

In embodiments of this application, a vehicle may communicate with another object based on a vehicle-to-external wireless communications technology (for example, vehicle to everything (V2X)). For example, communication between a vehicle and another object may be implemented based on an inter-vehicle wireless communications technology (for example, vehicle to vehicle (V2V)). Communication between a vehicle and another object may be performed based on Wi-Fi, the 5th generation (5th generation, 5G) mobile communications technology, long term evolution (long term evolution, LTE), or the like.

The industry proposes a classification standard for autonomous driving vehicles. A driving automation classification standard proposed by the Society of Automotive Engineers International (Society of Automotive Engineers International, SAE International for short) includes six levels: L0 to L5. L0 to L2 indicate that a driver support system can provide some support functions for a driver. However, regardless of whether the driver support functions of a vehicle are enabled, a driver needs to autonomously drive the vehicle, and monitor the support functions provided by the driver support system at all times, and needs to perform steering, braking, or acceleration as required to ensure safety. Differences of L0 to L2 support functions are as follows: L0 indicates that no driving automation is provided, and the support function is limited to warning and instantaneous assistance; the L1 support function is to provide steering or braking/acceleration support for the driver; and the L2 support function is to provide steering and braking/acceleration support for the driver. L3 semi-autonomous driving: The autonomous driving system can complete some driving tasks and monitor a driving environment in some cases. However, the driver needs to be prepared to obtain the driving control right at any time. For example, the driver needs to drive as requested by a function. L4 highly autonomous driving: The autonomous driving system can complete driving tasks and monitor a driving environment in specific environments under specific conditions. L5 fully autonomous driving: The autonomous driving system can complete all driving tasks under all conditions. The solutions in embodiments of this application may be applied to a vehicle whose autonomous driving capability reaches L2 or higher. Details are not described below.

In addition, it should be understood that, based on an actual use requirement, the technical solutions of this application may also be applied to another carrier or transportation means such as an aircraft or a mobile robot.

Figure 2:
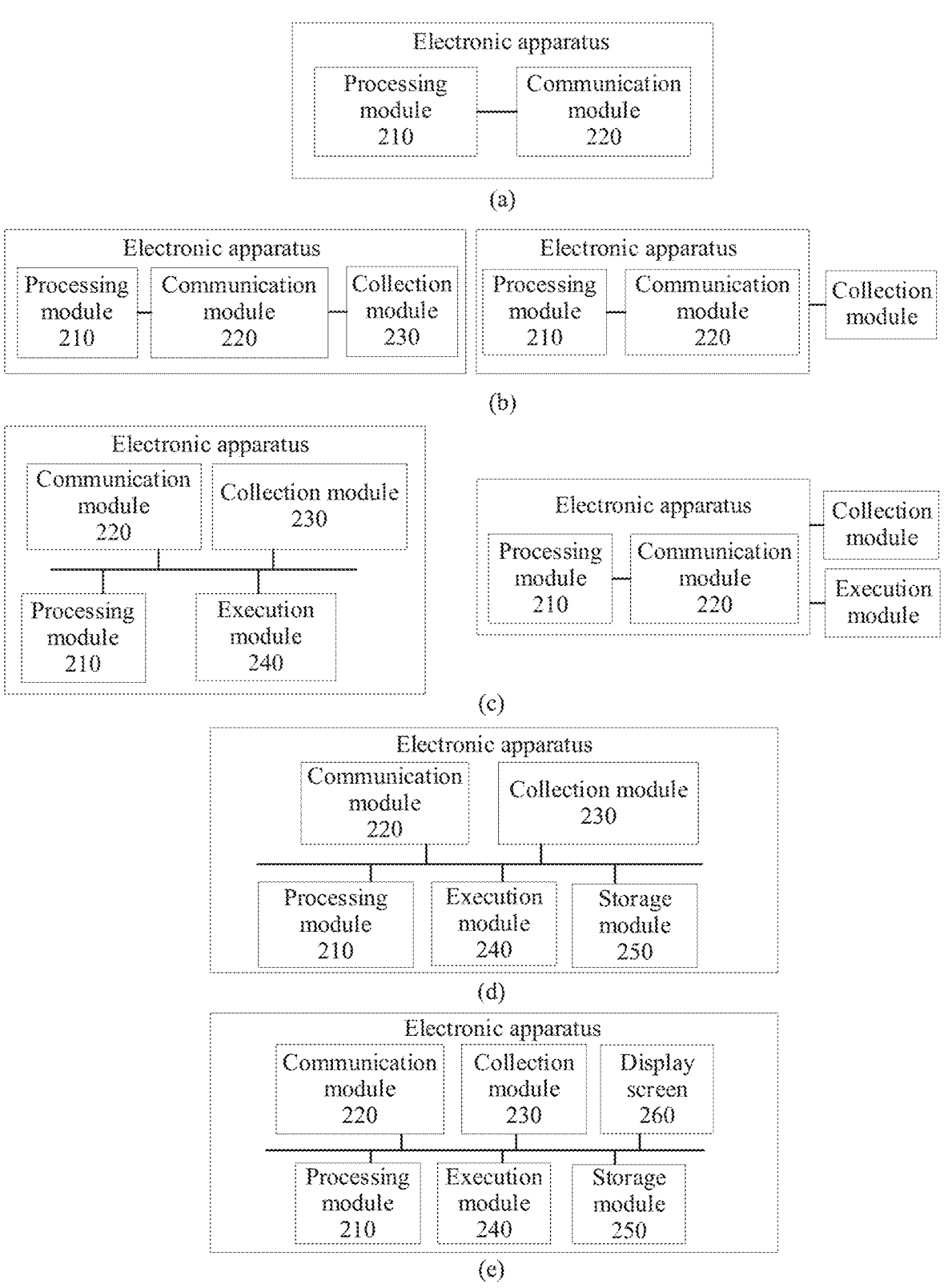
FIG. 2 is a schematic diagram of a structure of an electronic apparatus according to this application.

For example, (a) in FIG. 2 is a schematic diagram of a structure of a possible electronic apparatus. The structure may include a processing module 210 and a communication module 220. In some embodiments, the structure shown in (a) in FIG. 2 may be a vehicle-mounted device, or a functional component having the electronic apparatus shown in this application.

In some embodiments, as shown in (b) in FIG. 2, the electronic apparatus may further include a collection module 230 configured to collect perception information. The collection module in embodiments of this application may include an apparatus used for an information collection function, such as a camera apparatus and a radar apparatus. The radar may include a lidar, a millimeter-wave radar, an ultrasonic radar, or the like.

It may be understood that the perception information obtained by the electronic apparatus in embodiments of this application includes information about an ego vehicle and perception information of a surrounding environment in which the ego vehicle is located.

For example, the perception information in embodiments of this application may include a location of the ego vehicle, current wheel steering of the ego vehicle, a location of another vehicle within an ego vehicle threshold range, a distance between the another vehicle and the ego vehicle, a location of a road boundary within the ego vehicle threshold range, a distance between the road boundary and the ego vehicle, and the like.

The threshold range in this application may be a maximum perception range of a collection apparatus (for example, a sensor) of the ego vehicle. For example, if the perception range of the collection apparatus of the ego vehicle is a circular area formed by using the vehicle in which the collection apparatus is located as a center and a radius of 200 meters, the threshold range in this application may be the circular area formed by using the ego vehicle as a center and a radius of 200 meters.

In some embodiments, as shown in (c) in FIG. 2, the electronic apparatus may further include an execution module 240, configured to execute a decision solution obtained by the processing module.

For example, when the vehicle is in an autonomous driving state, after obtaining, by using the communication module in the electronic apparatus, a decision solution determined by the processing module, the execution module controls, according to the decision solution, the vehicle to travel.

It may be understood that when the electronic apparatus does not include the execution module, the communication module in the electronic apparatus may send, in a wired or wireless connection manner (for example, a Bluetooth connection, a network connection, or an interface circuit), the decision solution to an execution module externally connected to the electronic apparatus, so that the execution module controls autonomous driving of the vehicle according to the decision solution.

In some embodiments, as shown in (d) in FIG. 2, the electronic apparatus may further include a storage module 250, configured to store one or more programs and data information, where the one or more programs include instructions.

In some embodiments, as shown in (e) in FIG. 2, the electronic apparatus may further include a display screen 260, and the display screen 260 may display a decision solution in real time.

When the structure is a vehicle-mounted device or another electronic device, the collection module 230 may include an apparatus configured to support a perception information collection function, such as a camera apparatus or a radar apparatus. The processing module 210 may be a processor, for example, a central processing unit (central processing unit, CPU). The collection module 230 may communicate with the processing module 210 through the communication module 220. The processing module 210 may perform, based on the obtained perception information, the intelligent driving method provided in this application.

When the structure is a functional component having the electronic apparatus shown in this application, the collection module 230 may include an apparatus configured to support a perception information collection function, such as a camera apparatus, a perception apparatus, and a radar apparatus. The processing module 210 may be a processor. The collection module 230 may communicate with the processing module 210 through the communication module 220. The processing module 210 may perform, based on the obtained perception information, the intelligent driving method provided in this application.

When the structure is a chip or a chip system, the collection module 230 may be one or more of a camera apparatus, a perception apparatus, or a radar apparatus controlled by the chip; and the processing module 210 may be a processor of the chip, and may include one or more central processing units. It should be understood that the processing module 210 in this embodiment of this application may be implemented by a processor or a processor-related circuit component, and the collection module 230 may be implemented by a related collection apparatus such as a camera apparatus, a perception apparatus, and a radar apparatus.

The processing module 210 may be configured to perform all operations of the intelligent driving method performed by the electronic apparatus in any embodiment of this application, for example, obtain a decision solution set based on obtained perception information, then determine, from the decision solution set, a first decision solution used for a first interaction phase with a game target, continuously track a status of the game target in a process of the first interaction phase with the game target, and after determining that the ego vehicle and the game target meet a condition for entering a second interaction phase, perform traveling by using a second decision solution corresponding to the second interaction phase.

The perception information obtained by the processing module 210 may be one or more of image information or sound information collected by an external sensor or camera; or the perception information obtained by the processing module 210 may be one or more of image information or sound information collected by a sensor or camera of the electronic apparatus.

Figure 3:
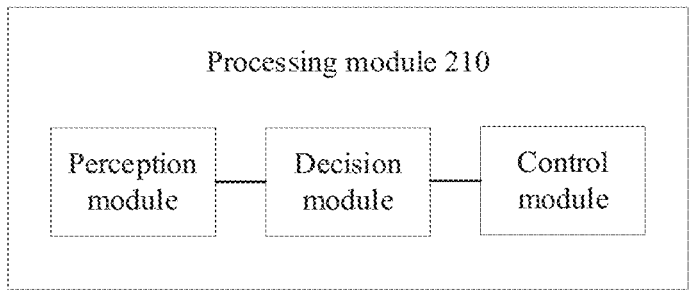
FIG. 3 is a schematic diagram of composition of a processing module according to this application.

The processing module 210 may include a plurality of function modules. For example, as shown in FIG. 3, the plurality of function modules included in the processing module may be a perception module, a decision module, and a control module. The perception module is configured to perform an analysis operation on perception information, and establish a world model including a road, an obstacle, a game target, and the like for a downstream module. The decision module can generate a decision solution based on the perception information, to obtain an expected track. The control module can perform autonomous driving based on the decision solution.

Figure 4:
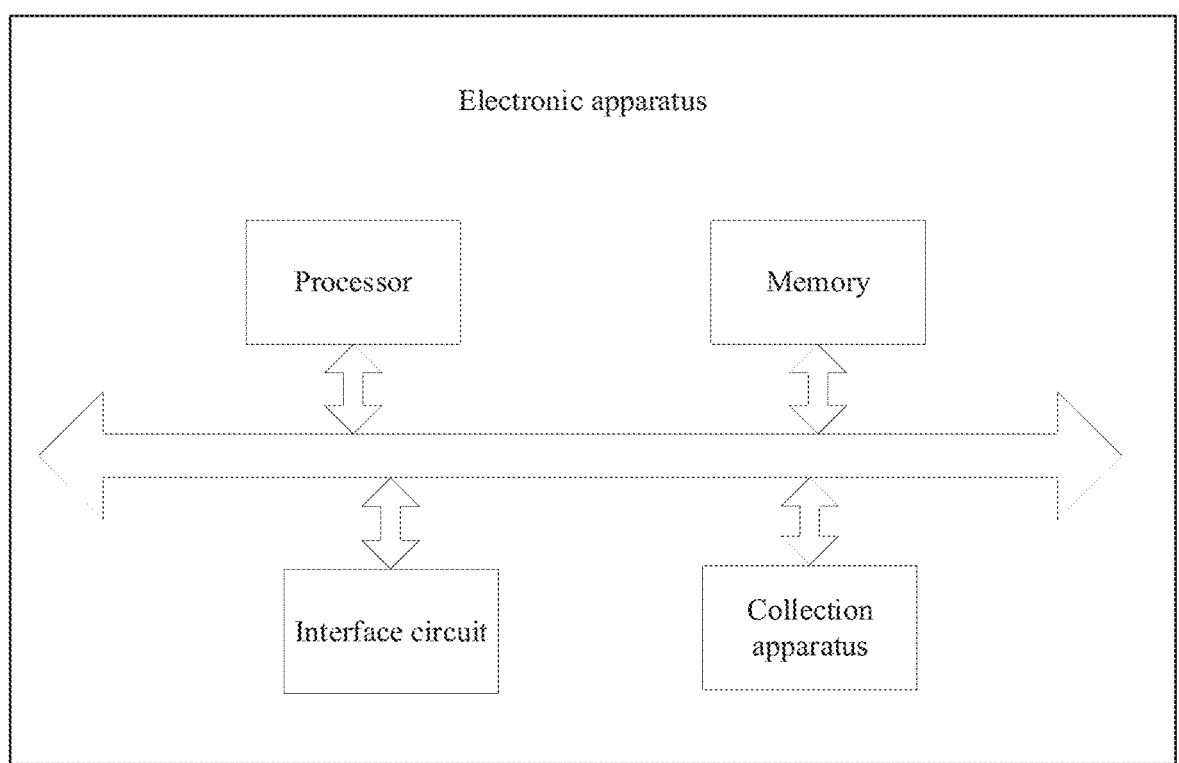
FIG. 4 is a schematic diagram of a structure of a second electronic apparatus according to this application.

FIG. 4 is a schematic diagram of a structure of another electronic apparatus, configured to perform actions performed by the electronic apparatus according to embodiments of this application. As shown in FIG. 4, the electronic apparatus may include a processor, a memory, and an interface circuit.

In addition, the electronic apparatus may further include another component, for example, a collection apparatus. The processor is mainly configured to implement a processing operation provided in embodiments of this application, for example, perform analysis processing on obtained perception information. The memory is mainly configured to store a software program and data. The collection apparatus may be configured to collect perception information and the like. The interface circuit may be configured to support communication of the electronic apparatus. For example, after collecting perception information, the collection apparatus may send the collected perception information to the processor by using the interface circuit. The interface circuit may include a transceiver or an input/output interface.

Figure 5:
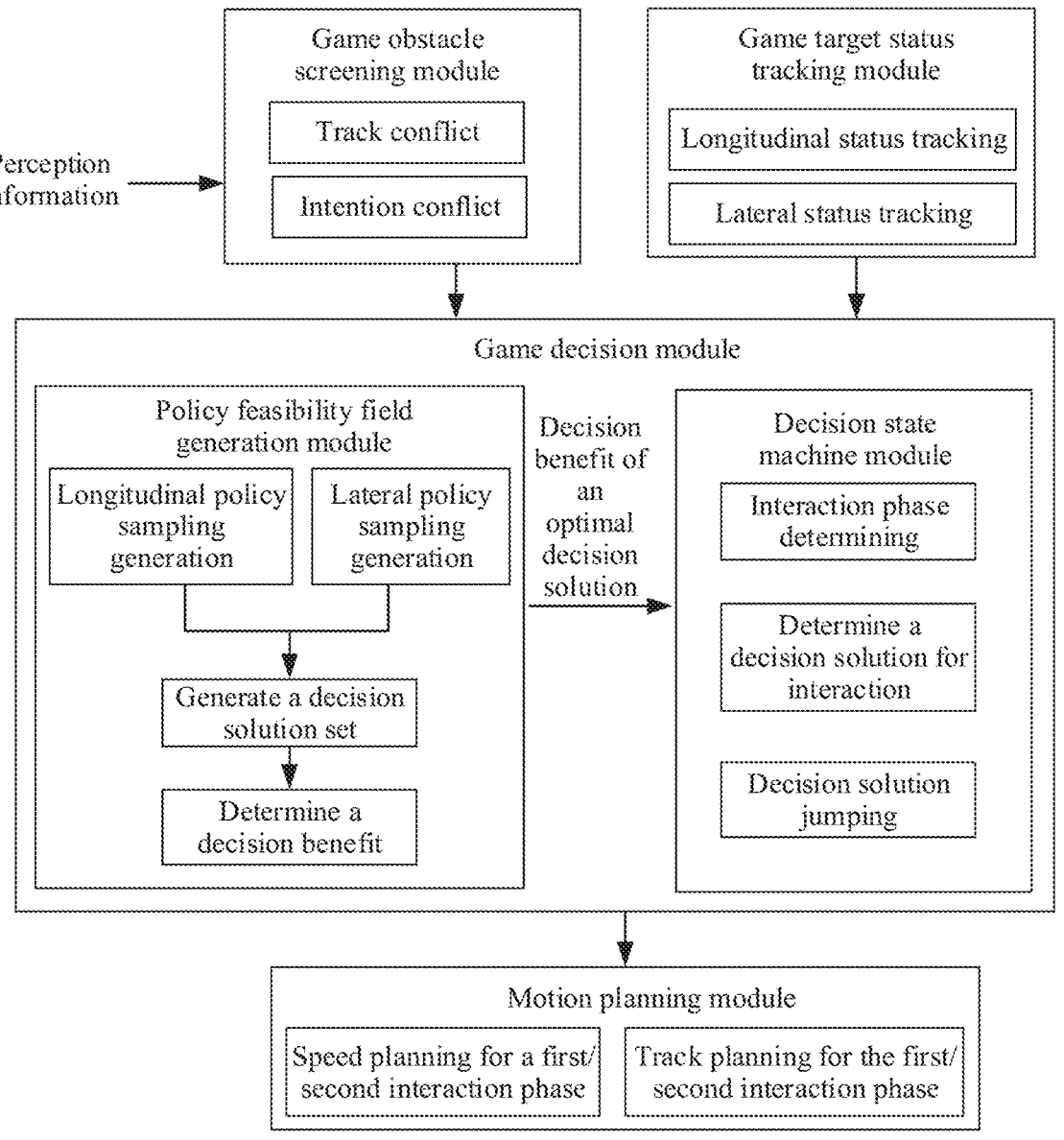
FIG. 5 is a schematic diagram of a structure of a third electronic apparatus according to this application.

Further, as shown in FIG. 5, an embodiment of this application further provides a vehicle decision system. The vehicle decision system may include a game obstacle screening module, a game target status tracking module, a game decision module, a motion planning module, and the like.

The game obstacle screening module is configured to obtain perception information, and determine a game target based on the perception information.

In some embodiments, the perception information obtained by the game obstacle screening module may be collected by a collection module inside the electronic apparatus, or may be collected by a collection module externally connected to the electronic apparatus.

Further, in this embodiment of this application, when the game obstacle screening module determines the game target based on the perception information, the following two aspects may be considered.

In a first aspect, the game obstacle screening module may determine at least one target based on the obtained perception

12 tion information, and predict a moving track of the at least one target. Then, the game obstacle screening module determines a target, in the at least one target, whose moving track conflicts with a moving track of the ego vehicle as the game target. The track conflict in this embodiment of this application is used to indicate a case in which the target is currently in a moving state and a future moving track of the target collides with the moving track of the ego vehicle.

Figure 6:
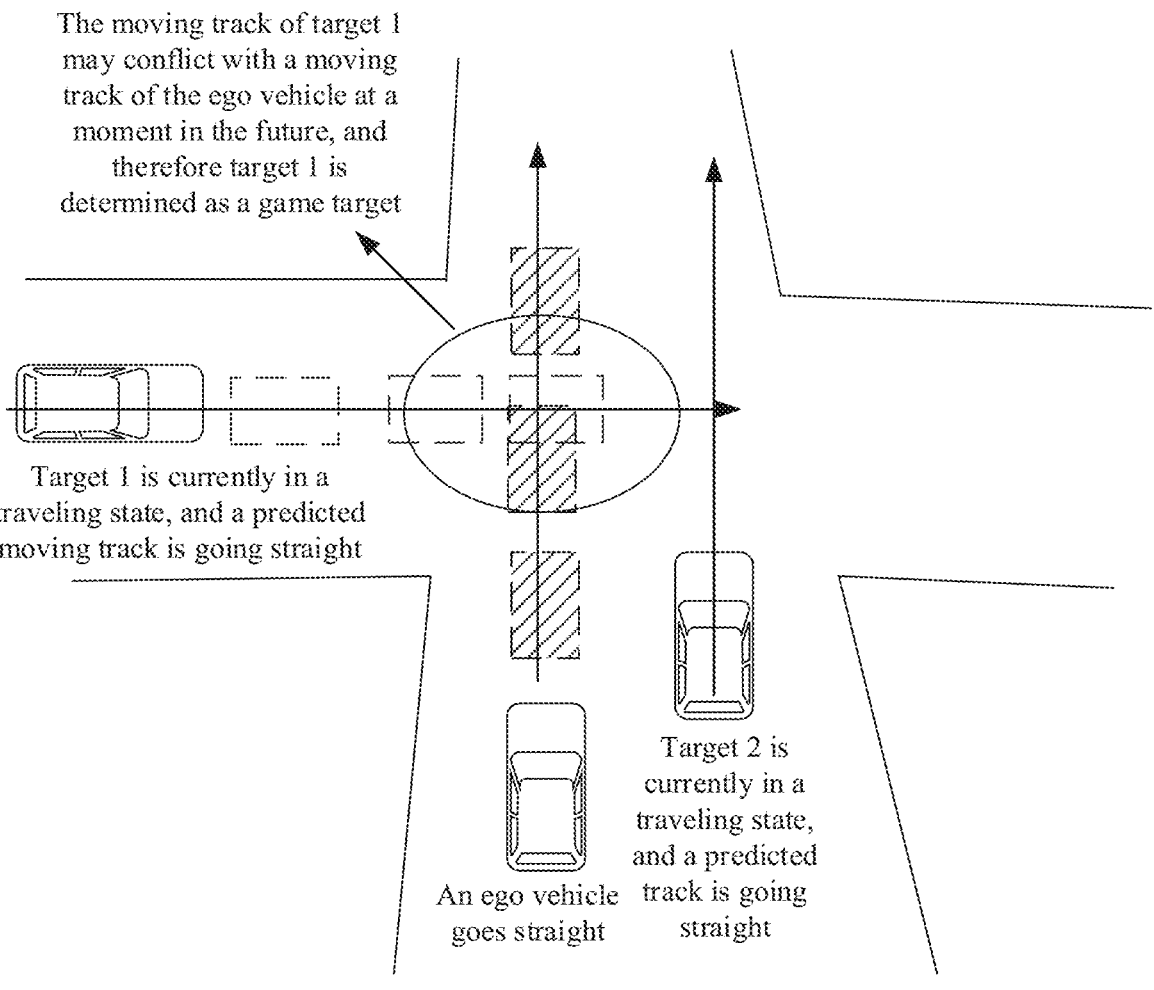
FIG. 6 is a schematic diagram of a game target determining scenario according to this application.

For example, as shown in FIG. 6, it is assumed that the moving track of the ego vehicle is straight, and the game obstacle screening module determines, based on the obtained perception information, that there are two targets in a current range: a target 1 and a target 2, and the target 1 and the target 2 are in a moving state. The game obstacle screening module may generate, based on a road topology and a motion status, a predicted track corresponding to the target 1 and a predicted track corresponding to the target 2. The predicted track of the target 1 conflicts with the moving track of the ego vehicle, the target 2 is in a state of moving in the same direction as the ego vehicle, and the predicted track of the target 2 does not conflict with the moving track of the ego vehicle. In this case, the game obstacle screening module determines the target 1 as the game target, that is, the ego vehicle engages in a game with the target 1 in a moving process. A subsequent motion decision of the ego vehicle needs to be made based on the predicted track of the target 1.

In this embodiment of this application, whether a predicted track of a target conflicts with the moving track of the ego vehicle may be determined in the following two manners:

Manner 1: If a predicted track of a target A intersects the moving track of the ego vehicle, and a location of the target A is not behind the ego vehicle (that is, the target is a non-following target), the game obstacle screening module may consider that at a future moment starting from a current moment, the predicted track of the target A conflicts with the moving track of the ego vehicle, and determine the target A as the game target.

For example, it is assumed that the current moment is 10:08:20. The ego vehicle predicts the future moving track of the target A, and learns, with reference to the future moving track of the ego vehicle, that if the ego vehicle and the target A travel based on the predicted moving tracks in the future, the moving track of the ego vehicle and the moving track of the target A intersect at 10:08:25 in the future. Therefore, the game obstacle screening module determines that the predicted track of the target A conflicts with the moving track of the ego vehicle in the future.

Manner 2: If an included angle between a predicted track of a target A and the moving track of the ego vehicle is less than a threshold included angle, the game obstacle screening module may consider that at a future moment starting from a current moment, the predicted track of the target A conflicts with the moving track of the ego vehicle, and determine the target A as the game target.

For example, it is assumed that the current moment is 11:09:32. The ego vehicle predicts the future moving track of the target A, and learns, with reference to the future moving track of the ego vehicle, that if the ego vehicle and the target A travel based on the predicted moving tracks in the future, at 11:09:36 in the future, an included angle between the moving track of the ego vehicle and the moving track of the target A is less than the threshold included angle (for example, the threshold included angle may be 60 degrees). Therefore, the game obstacle screening module determines that the predicted track of the target A conflicts with the moving track of the ego vehicle in the future.

In a second aspect, the game obstacle screening module may determine at least one target based on the obtained perception information, and predict a motion intention of the one target. Then, the game obstacle screening module determines a target, in the at least one target, whose motion intention has an intention conflict with a moving track of the ego vehicle as the game target. The intention conflict in this embodiment of this application is used to indicate a case in which the target is currently in a static state and will be in a moving state in the future, and a future motion intention of the target conflicts with the moving track of the ego vehicle.

Figure 7:
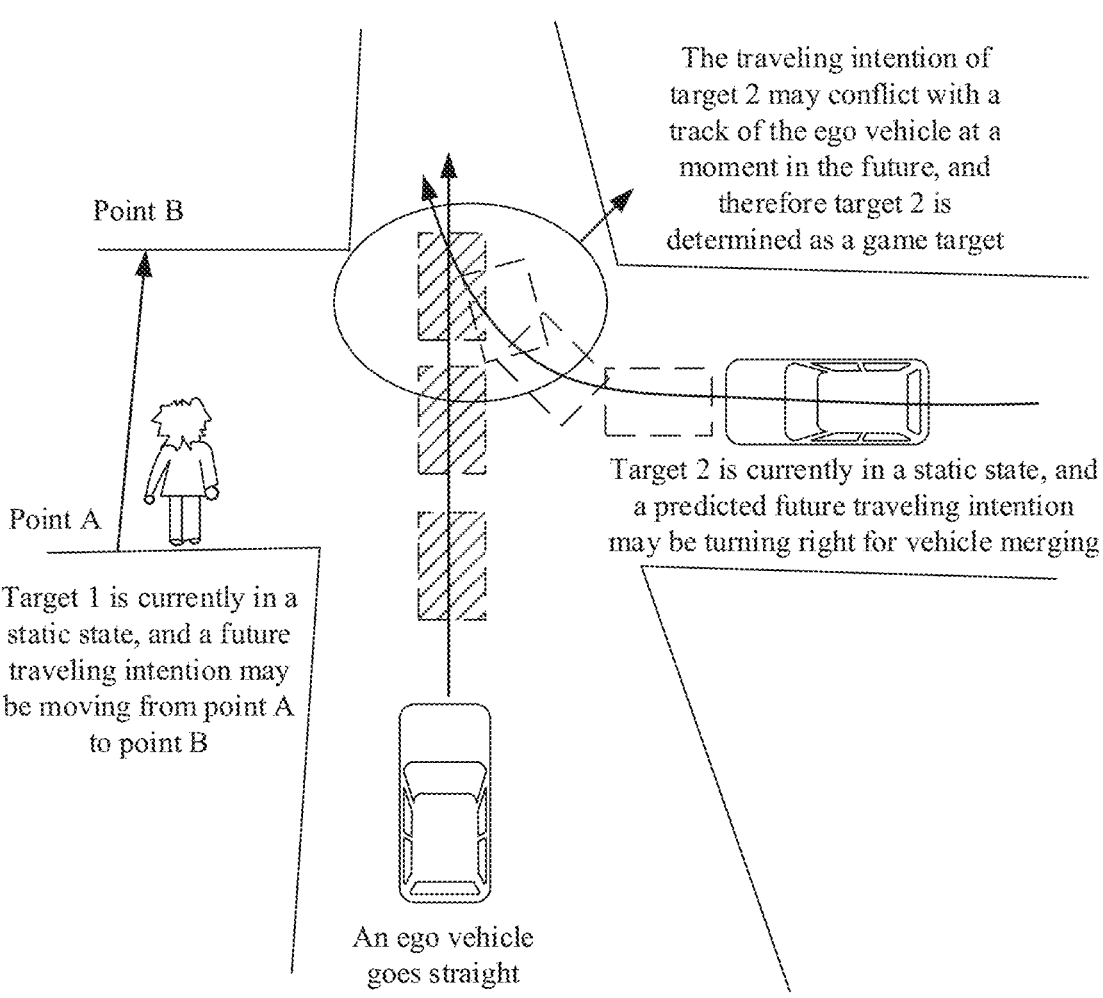
FIG. 7 is a schematic diagram of another game target determining scenario according to this application.

For example, as shown in FIG. 7, it is assumed that the moving track of the ego vehicle is straight. The game obstacle screening module determines, based on obtained perception information, that there are two targets in a current perception range of the ego vehicle: a target 1 and a target 2, and currently both the target 1 and the target 2 are in a static state. The game obstacle screening module further predicts, based on the obtained perception information, that a motion intention of the target 1 may be moving from a point A to a point B, which does not conflict with the moving track of the ego vehicle, and a motion intention of the target 2 may be turning right, which may conflict with the moving track of the ego vehicle at a future moment. Therefore, the game obstacle screening module determines the target 2 as the game target, that is, the ego vehicle engages in a game with the target 2 in a moving process, and a subsequent motion decision of the ego vehicle needs to be made based on a predicted track of the target 2.

In this embodiment of this application, whether a motion intention of a target conflicts with the moving track of the ego vehicle may be determined in the following two manners:

Manner 1: If a target A is currently in a static state, the game obstacle screening module determines a motion intention of the target A based on perception information, and predicts, based on the motion intention of the target A, that a moving track of the target A in the future intersects the moving track of the ego vehicle. In this case, the game obstacle screening module may consider that the motion intention of the target A conflicts with the moving track of the ego vehicle at a future moment starting from a current moment, and the game obstacle screening module determines the target A as the game target.

Manner 2: If a target A is currently in a static state, the game obstacle screening module determines a motion intention of the target A based on perception information, and predicts, based on the motion intention of the target A, that an included angle between a future moving track of the target A and the moving track of the ego vehicle is less than a threshold included angle. In this case, the game obstacle screening module may consider that the motion intention of the target A conflicts with the moving track of the ego vehicle at a future moment starting from a current moment, and the game obstacle screening module determines the target A as the game target.

The game target status tracking module is configured to: in a process of the game between the ego vehicle and the game target, continuously observe a motion status of the game target, including a lateral status feature and a longitudinal status feature, and record key information, so as to provide an input for subsequently determining consistency or inconsistency between an actual moving track of the game target and an expected moving track of a decision solution.

The game decision module is configured to generate a decision solution.

Optionally, the game decision module may include a policy feasibility field generation module and a decision state machine module.

The policy feasibility field generation module is configured to generate a decision solution set based on obtained perception information.

Figure 8:
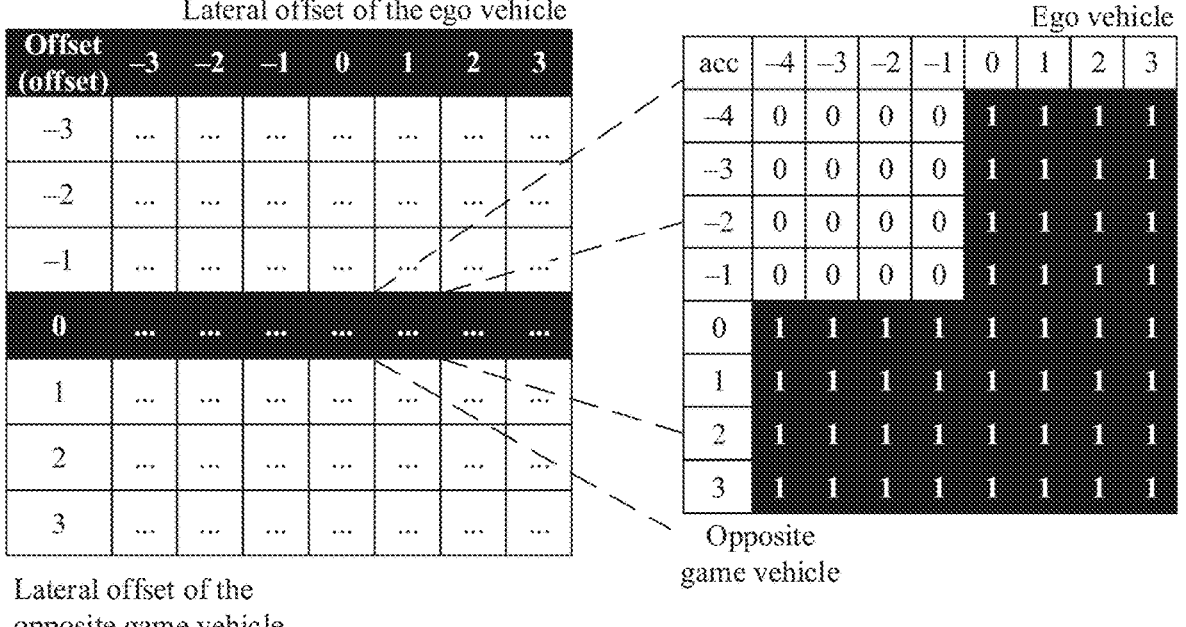
FIG. 8 is a schematic diagram of generating a lateral and longitudinal sampling policy according to this application.

In some embodiments, as shown in FIG. 8, the policy feasibility field generation module may generate a longitudinal acceleration sampling dimension based on obtained perception information with reference to longitudinal feature information such as a road speed limit, an acceleration change Jerk value, and a game target type, and generate a lateral offset sampling dimension with reference to feature information such as a road boundary, a static obstacle, and vehicle kinematics. The policy feasibility field generation module combines the lateral position offset sampling dimension and the longitudinal acceleration sampling dimension to form sampling space, where the formed sampling space is possible space of all policies. The policy feasibility field generation module may obtain a set of all decision solutions based on the formed sampling space.

The policy feasibility field generation module may divide the decision solution set into at least one decision solution subset based on a category of an action pair of the ego vehicle and the game target included in each decision solution in the decision solution set. To be specific, the policy feasibility field generation module may mark decision labels for all action pairs of the ego vehicle and the game target in the decision solution set, and group a cluster with a consistent label into a decision solution subset, where each decision solution subset includes at least one decision solution.

In this manner, the decision solution set may be divided into a plurality of decision solution subsets. For example, in some scenarios, the policy feasibility field generation module may divide the decision solution set into four decision solution subsets: rushing with avoidance, yielding and keeping, rushing and keeping, and yielding with avoidance.

A target decision solution in embodiments of this application is a decision solution with a highest decision benefit in a corresponding decision solution subset. For example, it is assumed that a decision solution subset A includes three decision solutions: a decision solution 1, a decision solution 2, and a decision solution 3, where a decision benefit of the decision solution 3 is higher than a decision benefit of the decision solution 2 and a decision benefit of the decision solution 1. In this case, the decision solution 1 is a target decision solution in the decision solution subset A.

In addition, in this embodiment of this application, the policy feasibility field generation module may determine, based on a first calculation manner (for example, a benefit evaluation system that is provided in this embodiment of this application and that is used to calculate a benefit corresponding to a decision solution), a decision benefit corresponding to a decision solution.

The benefit evaluation system that is provided in this embodiment of this application and that is used to calculate a benefit corresponding to a decision solution may include several decision dimensions such as safety, comfort, passability, a right of way, an offset, and a historical decision result of a decision solution.

For example, a decision benefit in the benefit evaluation system may be determined based on a decision cost (cost). A smaller cost indicates a higher decision benefit and a higher probability that the decision solution is used as an optimal decision solution. Specific evaluation dimensions and explanations are as follows:

(1) Safety cost: The safety cost in this embodiment of this application is mainly a decision cost obtained based on a distance between an ego vehicle and a game vehicle in a process of deriving a moving track of the ego vehicle and deriving a moving track of the game vehicle.

A smaller distance between the ego vehicle and the game vehicle indicates lower safety. That is, a smaller distance between the ego vehicle and the game vehicle indicates a larger safety cost of the ego vehicle, and a smaller safety-based decision benefit of the ego vehicle.

Further, in this embodiment of this application, a minimum distance between the ego vehicle and the game vehicle may be further set. In a process in which the distance between the ego vehicle and the game vehicle gradually approaches the minimum distance, the safety cost gradually increases, and the safety-based decision benefit gradually decreases. When the distance between the ego vehicle and the game vehicle is not greater than the minimum distance, the safety cost reaches the maximum, and the safety-based decision benefit reaches the minimum.

In addition, in this embodiment of this application, a maximum distance between the ego vehicle and the game vehicle that is used to calculate a safety cost may be further set. When the distance between the ego vehicle and the game vehicle is not less than the maximum distance, the safety cost reaches the minimum, and the safety-based decision benefit reaches the maximum.

Figure 9:
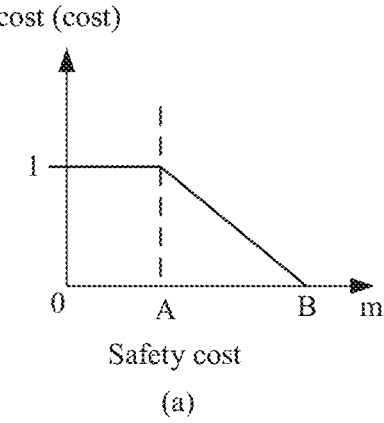
FIG. 9 is a schematic diagram of a decision benefit evaluation curve according to this application.
Figure 9:
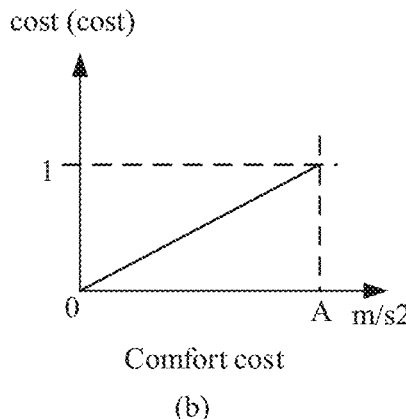
Figure 9:
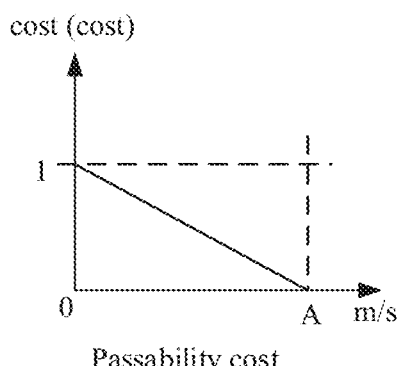
Figure 9:
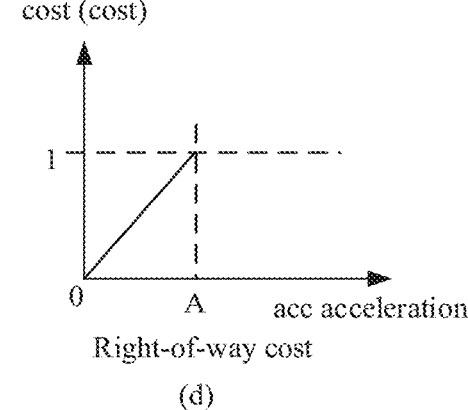
Figure 9:
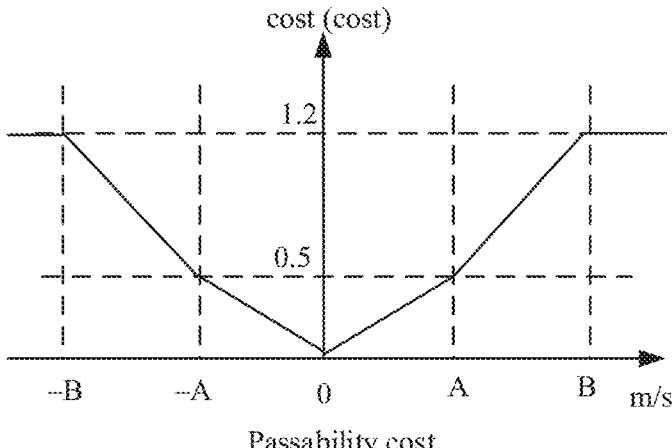
Figure 9:
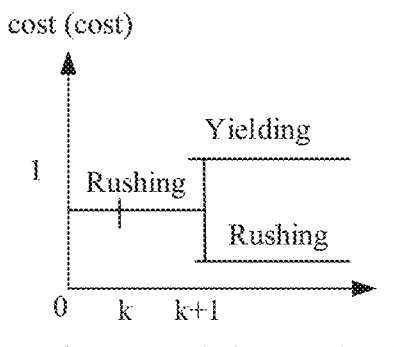

For example, as shown in (a) in FIG. 9, a horizontal axis represents the distance between the ego vehicle and the game vehicle, a point A in the horizontal axis represents the minimum distance between the ego vehicle and the game vehicle that is set in this embodiment of this application, a point B in the horizontal axis may represent the maximum distance between the ego vehicle and the game vehicle that is set in this embodiment of this application and that is used to calculate a safety cost, and a vertical axis represents a safety cost.

When the distance between the ego vehicle and the game vehicle is not less than B, the safety cost is minimized, and the safety-based decision benefit is maximized. When the distance between the ego vehicle and the game vehicle is between the point A and the point B, as the distance between the ego vehicle and the game vehicle becomes closer to the point A, the safety cost becomes larger, and the safety-based decision benefit becomes smaller; and as the distance between the ego vehicle and the game vehicle becomes closer to the point B, the safety cost becomes smaller, and the safety-based decision benefit becomes larger. When the distance between the ego vehicle and the game vehicle is not greater than A, the safety cost is maximized, and the safety-based decision benefit is minimized.

The point A and the point B shown in (a) in FIG. 9 in this embodiment of this application may be obtained based on actual experience. For example, in this embodiment of this application, the point A shown in (a) in FIG. 9 may be 0.2 m to 0.5 m (for example, the point A is 0.5 m), and the point B may be 1.0 m to 3.0 m (for example, the point B is 2.5 m).

(2) Comfort cost: The comfort cost in this embodiment of this application is mainly a decision cost obtained based on a difference between a current acceleration and an expected acceleration of the ego vehicle.

A smaller difference between the current acceleration and the expected acceleration of the ego vehicle indicates a smaller comfort cost and a larger comfort-based decision benefit of the ego vehicle.

Further, in this embodiment of this application, a maximum difference between the current acceleration and the expected acceleration of the ego vehicle may be further set. When the difference between the current acceleration and the expected acceleration of the ego vehicle is closer to the maximum difference, the comfort cost is larger, and the comfort-based decision benefit is smaller.

For example, as shown in (b) in FIG. 9, a horizontal axis represents the difference between the current acceleration and the expected acceleration of the ego vehicle. For example, the current acceleration of the ego vehicle is 1 m/S^2, and the expected acceleration is 4 m/S^2. In this case, a difference between the current acceleration and the expected acceleration of the ego vehicle is 3 m/S^2. A point A in the horizontal axis represents the maximum difference between the current acceleration and the expected acceleration of the ego vehicle that is set in this embodiment of this application.

When the difference between the current acceleration and the expected acceleration of the ego vehicle is closer to the point A, the comfort cost is larger, and the comfort-based decision benefit is smaller. When the difference between the current acceleration and the expected acceleration of the ego vehicle is farther from the point A, the comfort cost is smaller, and the comfort-based decision benefit is larger. When the difference between the current acceleration and the expected acceleration of the ego vehicle is not less than an acceleration value corresponding to the point A, the comfort cost is maximized, and the comfort-based decision benefit is minimized.

The point A shown in (b) in FIG. 9 in this embodiment of this application may be obtained based on actual experience.

For example, in this embodiment of this application, the point A shown in (b) in FIG. 9 may be 5 m/S^2 to 7 m/S^2 (for example, the point A is 6 m/S^2).

(3) Passability cost: In this embodiment of this application, the passability cost is mainly a decision cost obtained based on a speed difference between a current speed of the ego vehicle and a speed at which the ego vehicle reaches a conflict point (for example, a point at which the track of the ego vehicle may intersect with the track of the game target).

A larger speed difference (the current speed minus the speed at the conflict point) indicates a larger passability cost and a smaller passability-based decision benefit of the ego vehicle.

Further, in this embodiment of this application, a maximum value of the speed difference may be further set. When the speed difference is closer to the maximum value, the passability cost is larger, and the passability-based decision benefit is smaller.

For example, as shown in (c) in FIG. 9, a horizontal axis represents the speed difference, and a point A in the horizontal axis represents the maximum value of the speed difference that is set in this embodiment of this application. When the speed difference is closer to the point A, the passability cost is larger, and the passability-based decision benefit is smaller. When the speed difference is farther from the point A, the passability cost is smaller, and the passability-based decision benefit is larger. When the speed difference is not less than a speed difference corresponding to the point A, the passability cost is maximized, and the passability-based decision benefit is minimized.

The point A shown in (c) in FIG. 9 in this embodiment of this application may be obtained based on actual experience.

For example, in this embodiment of this application, the point A shown in (c) in FIG. 9 may be 6 m/s to 10 m/s (for example, the point A is 7 m/s).

(4) Right-of-way cost: In this embodiment of this application, the right-of-way cost is a decision cost obtained based on a right-of-way status of the ego vehicle or the game target with reference to a current acceleration of the ego vehicle.

In this embodiment of this application, calculation is mainly performed based on a party with a high right of way, and a right-of-way cost penalty is performed on the party with a right of way. For example, if the ego vehicle has a high right of way, a right-of-way cost penalty is performed if the ego vehicle decelerates.

It may be understood that the right of way in this embodiment of this application is a relative relationship between the ego vehicle and the game target. When the right of way of the ego vehicle is higher than the right of way of the game target, because the right of way of the ego vehicle is higher, the vehicle with the higher right of way should not change a motion status as much as possible in the interactive game process. Therefore, if the acceleration of the ego vehicle decreases and the ego vehicle decelerates, a relatively high right-of-way cost penalty should be imposed on the change of the motion status of the ego vehicle. That is, when the right of way of the ego vehicle is higher than that of the game target, a smaller current acceleration of the ego vehicle indicates a larger right-of-way cost and a smaller right-of-way-based decision benefit of the ego vehicle.

Further, in this embodiment of this application, a minimum value of the current acceleration of the ego vehicle may be further set. When the current acceleration of the ego vehicle is closer to the minimum value, the right-of-way cost is larger, and the right-of-way-based decision benefit is smaller.

For example, as shown in (d) in FIG. 9, ACC represents acceleration, and a high right of way of the ego vehicle is a restrictive premise. For example, the high right of way of the ego vehicle is used as a prerequisite input, and a right-of-way cost is further determined based on a current right-of-way relationship between the ego vehicle and the game target.

A horizontal axis represents the current acceleration of the ego vehicle, and a point A in the horizontal axis represents the minimum difference value of the current acceleration of the ego vehicle that is set in this embodiment of this application. When the current acceleration of the ego vehicle is closer to the point A, the right-of-way cost is larger, and the right-of-way-based decision benefit is smaller. When the current acceleration of the ego vehicle is farther from the point A, the right-of-way cost is smaller, and the right-of-way-based decision benefit is larger. When the current acceleration of the ego vehicle is not greater than an acceleration value corresponding to the point A, the right-of-way cost is maximized, and the right-of-way-based decision benefit is minimized.

The point A shown in (d) in FIG. 9 in this embodiment of this application may be obtained based on actual experience.

For example, in this embodiment of this application, the point A shown in (d) in FIG. 9 may be (−1) m/S^2 to (−3) m/S^2 (for example, the point A is (−1) m/S^2).

(5) Offset cost: The offset cost in this embodiment of this application is mainly a decision cost obtained based on a location offset of the ego vehicle relative to a reference line. It may be understood that a longer offset distance of the ego vehicle relative to the reference line indicates a larger offset cost value and a smaller offset-based decision benefit of the ego vehicle.

In some embodiments, the reference line in this embodiment of this application may be a center line of a road on which the vehicle is located.

Figure 10:
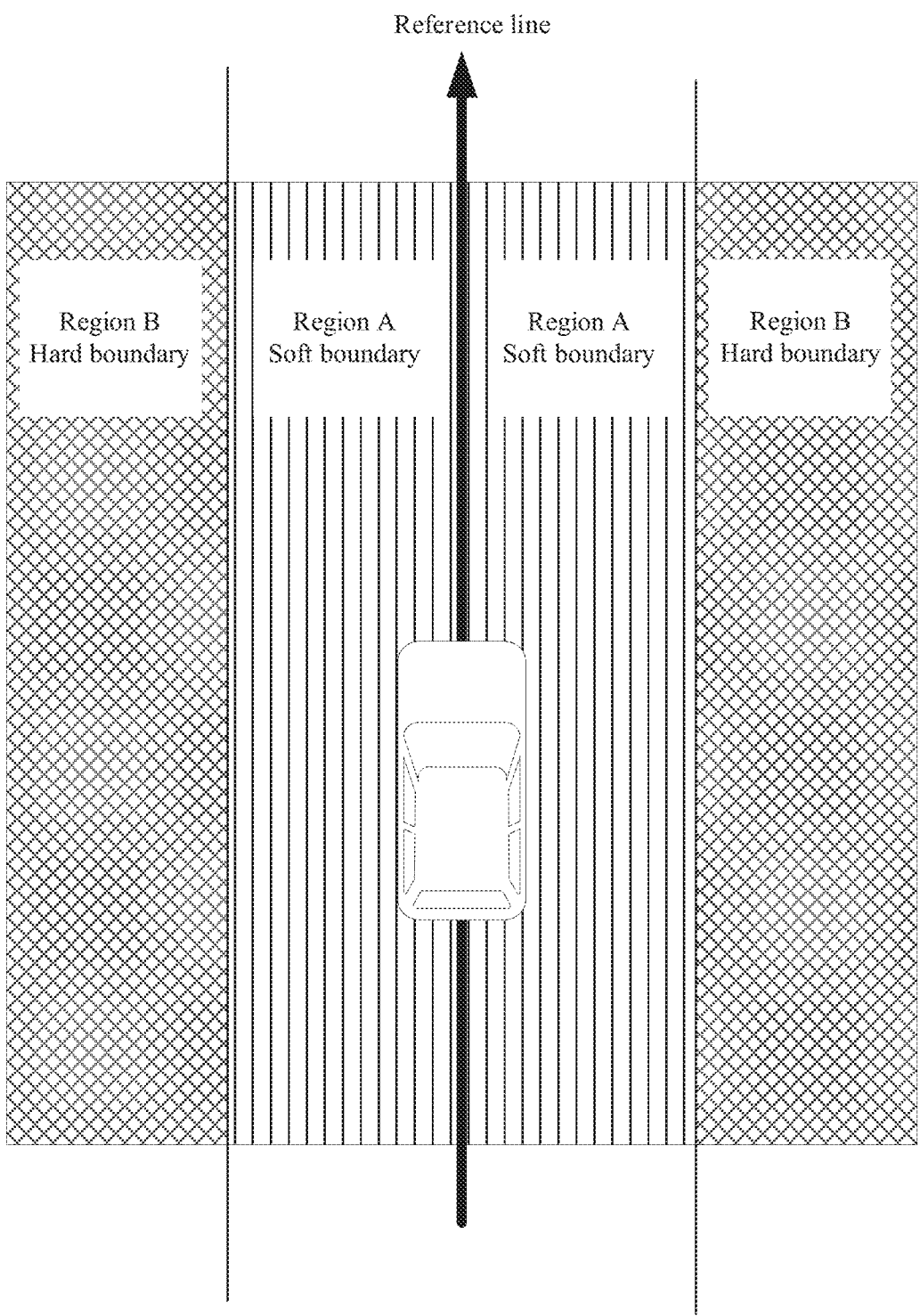
FIG. 10 is a schematic diagram of a vehicle traveling offset scenario according to this application.

Further, as shown in FIG. 10, in this embodiment of this application, there may be two offset regions, for example, a region A and a region B. In this embodiment of this application, the region A may be referred to as a soft boundary, and the region B may be referred to as a hard boundary.

It may be understood from the content in FIG. 10 that the soft boundary that is set in this embodiment of this application may be a region of a driving lane in which the vehicle is located. In other words, if the ego vehicle is offset relative to the reference line, but the ego vehicle keeps traveling in the driving lane, it may be understood that the ego vehicle is always within the soft boundary. The hard boundary that is set in this embodiment of this application may be a region outside the driving lane. In other words, if the ego vehicle is offset relative to the reference line, and the ego vehicle leaves the driving lane, it may be understood that the ego vehicle enters the hard boundary.

In addition, when the vehicle moves away from the driving lane, an offset of the vehicle relative to the reference line is larger, there are a relatively large quantity of risk factors in a traveling process, and safety is relatively low. Therefore, in this embodiment of this application, a penalty cost may be increased when the vehicle moves away from the driving lane, that is, when the vehicle is in the hard boundary. For example, in this embodiment of this application, based on different regions, different slope values for calculating an offset cost may be used for calculation. A slope value that is set in a soft boundary and that is used to calculate an offset cost may be relatively small, and a slope value that is set in a hard boundary and that is used to calculate an offset cost may be relatively large.

For example, as shown in (e) in FIG. 9, a horizontal axis represents a current offset distance between the ego vehicle and the reference line, a point-A in the horizontal axis represents a leftmost location of the soft boundary that is set in this embodiment of this application, a point 0 represents a reference line location, a point A represents a rightmost location of the soft boundary that is set in this embodiment of this application, a point-B represents a leftmost location of the hard boundary that is set in this embodiment of this application, and a point B represents a rightmost location of the hard boundary that is set in this embodiment of this application. An offset cost of the vehicle relative to the reference line in the soft boundary is calculated by using a slope 1, an offset cost of the vehicle relative to the reference line in the hard boundary is calculated by using a slope 2, and the slope 2 is greater than the slope 1.

When the offset distance between the ego vehicle and the point 0 of the reference line is larger, the offset cost is larger, and the offset-based decision benefit is smaller. When the offset distance between the ego vehicle and the point 0 of the reference line is not less than a distance corresponding to a point C, the offset cost reaches the maximum, and the offset-based decision benefit reaches the minimum.

In this embodiment of this application, the point A, the point B, the slope 1, and the slope 2 shown in (e) in FIG. 9 may be obtained based on actual experience.

For example, in this embodiment of this application, the point A shown in (e) in FIG. 9 may be 1.5 m to 2.5 m (for example, if the point A is 2 m, the corresponding point −A is −2 m), and the point B may be 1.9 m to 2.9 m (for example, if the point B is 2.9 m, the corresponding point −B is −2.9 m).

(6) Historical decision result cost: The historical decision result cost in this embodiment of this application may also be referred to as an inter-frame association cost, and is mainly a decision cost of a current frame that is obtained based on a decision solution of the last frame of the ego vehicle.

It may be understood that, for a same game target, if the last frame of the ego vehicle is rushing and a next frame of the ego vehicle is yielding, a speed change of the ego vehicle is relatively large, resulting in relatively large traveling fluctuation and reduced comfort. Therefore, to effectively ensure that the traveling fluctuation is relatively small, the fluctuation is alleviated, and traveling is more stable, if the ego vehicle rushes before, the ego vehicle keeps in the rushing state as far as possible.

For example, as shown in (f) in FIG. 9, if the Kth frame is rushing, and the $(K+1)^{th}$ frame is still rushing, the historical decision result cost is relatively small, and a decision benefit based on the historical decision result is relatively large. On the contrary, if the Kth frame is rushing, and the $(K+1)^{th}$ frame is yielding, the historical decision result cost is relatively large, and a decision benefit based on the historical decision result is relatively small.

Further, the electronic apparatus in this embodiment of this application may combine costs of the foregoing evaluation dimensions based on specific weight proportions, to obtain a multi-dimensional decision cost.

In some embodiments, the benefit evaluation system may be mainly determined based on a historical decision result, that is, mainly depend on the historical decision result (for example, a weight of the historical decision result cost is set to 80% to 90%), and a driving style of the vehicle may be determined based on the historical decision result, where the driving style is, for example, conservative, moderate, or radical.

In some embodiments, weights corresponding to the evaluation dimensions in the benefit evaluation system in this embodiment of this application are set as follows:
safety: 10000; passability: 6000; comfort: 500; right of way: 1000; offset: 2000; and risk area: 1000.

Therefore, a decision cost obtained in this embodiment of this application may be:

$$\text{safety cost} \times 10000 + \text{passability cost} \times 600 + \text{comfort cost} \times 500 +$$

$$\text{right-of-way cost} \times 1000 + \text{offset cost} \times 2000 + \text{risk area cost} \times 1000.$$

Further, for different traveling environments, weights corresponding to the evaluation dimensions in the benefit evaluation system may be different.

For example, a correspondence between a traveling environment and evaluation dimension weights may be shown in Table 1.

TABLE 1

| Correspondence between a traveling environment and evaluation dimension weights | |
| --- | --- |
| Traveling environment | Evaluation dimension weights |
| Rugged mountain road | Safety cost × 10000, passability cost × 6000, comfort cost × 500, right-of-way cost × 3000, offset cost × 500, and risk area cost × 2000 |

TABLE 1-continued

| Correspondence between a traveling environment and evaluation dimension weights | |
| --- | --- |
| Traveling environment | Evaluation dimension weights |
| Urban road | Safety cost × 10000, passability cost × 6000, comfort cost × 500, right-of-way cost × 1000, offset cost × 2000, and risk area cost × 1000 |

When a current traveling environment of the vehicle is an urban road, the policy feasibility field generation module may determine, based on content in Table 1, that weights corresponding to the evaluation dimensions in the used benefit evaluation system are: safety cost×10000, passability cost×6000, comfort cost×500, right-of-way cost×1000, offset cost×2000, and risk area cost×1000.

The decision state machine module may classify the decision solution subsets in the decision solution set into echelons based on decision solution benefits in each decision solution subset.

For example, the decision solution subsets in the decision solution set are classified into two echelons: a first echelon and a second echelon. A decision benefit of a target decision solution corresponding to each decision solution subset in the first echelon is not less than a threshold benefit, and a decision benefit of a target decision solution corresponding to each decision solution subset in the second echelon is less than the threshold benefit. From the perspective of decision solution benefits, benefits of the decision solutions in the first echelon are all greater than benefits of the decision solutions in the second echelon. That is, at the current moment, the decision solutions in the first echelon are "better" than the decision solutions in the second echelon.

Further, when the decision state machine module determines that a difference between decision benefits of optimal decision solutions in any two decision solution subsets in the first echelon is not greater than a threshold benefit difference, a first interaction phase is entered. In this case, an interaction relationship between the ego vehicle and the game target is unclear. An optimal decision solution of each decision solution subset is a decision solution with a highest benefit in the decision solution subset.

In some cases, after the decision state machine module performs echelon division and before the first interaction phase is entered, if the decision state machine module determines that a decision benefit of a decision solution in the first echelon is obviously higher than decision benefits of all other decision solutions in the first echelon, the decision state machine module may directly enter a second interaction phase. In this case, an interaction relationship between the ego vehicle and the game target is clear.

For example, it is assumed that the threshold benefit is 0.76, and the threshold benefit difference is 0.05. In an example scenario (for example, the ego vehicle goes straight, and a vehicle is about to merge at an intersection), the decision solution set includes four decision solution subsets: a decision solution subset 1 (corresponding to ego vehicle rushing with avoidance), a decision solution subset 2 (corresponding to ego vehicle rushing without avoidance), a decision solution subset 3 (corresponding to ego vehicle yielding without avoidance), and a decision solution 4 (corresponding to ego vehicle yielding with avoidance).

An optimal decision solution in the decision solution subset 1 is a decision solution 1, and a corresponding decision benefit is 0.8; an optimal decision solution in the decision solution subset 2 is a decision solution 2, and a corresponding decision benefit is 0.73; an optimal decision solution in the decision solution subset 3 is a target decision solution 3, and a corresponding decision benefit is 0.77; and an optimal decision solution in the decision solution subset 4 is a target decision solution 4, and a corresponding decision benefit is 0.69. For each decision solution subset, it may be considered that an optimal decision solution of the decision solution subset represents the decision solution subset. In other words, although each decision solution subset (for example, ego vehicle rushing with avoidance) may include a plurality of decision solutions, one of the plurality of decision solutions has the highest benefit, and may represent the decision solution subset as an optimal decision solution of the decision solution subset.

First, because the decision benefits of the decision solution 1 and the decision solution 3 are higher than the threshold benefit 0.76, and the decision benefits of the decision solution 2 and the decision solution 4 are lower than the threshold benefit, the decision state machine module classifies the decision solution subset 1 and the decision solution subset 3 into the first echelon, and classifies the decision solution subset 2 and the decision solution subset 4 into the second echelon.

Then, the decision state machine module only needs to determine, through comparison, whether a difference between the decision benefits of the optimal decision solutions in the first echelon is less than the threshold benefit difference 0.05. The difference between the decision benefit of the optimal decision solution 1 and the decision benefit of the optimal decision solution 3 is 0.03, which is less than the threshold benefit difference 0.05. Therefore, the decision state machine module currently cannot determine which decision solution (that is, ego vehicle rushing with avoidance or ego vehicle yielding with avoidance) is more suitable for this game, that is, cannot determine whether to use the optimal decision solution 1 or the optimal decision solution 3 as a driving policy. In this case, it may be understood that an interaction relationship between the ego vehicle and the game target is unclear, the first interaction phase needs to be entered, and in the first interaction phase, a possibility of jumping, by the ego vehicle and the game target, between a plurality of corresponding different decision solutions is reserved.

Further, when determining that the interaction between the ego vehicle and the game target meets a condition for entering the second interaction phase, the decision state machine module enters the second interaction phase from the first interaction phase. In this case, the interaction relationship between the ego vehicle and the game target is clear.

The decision state machine module may determine, based on the following two aspects, whether the condition for entering the second interaction phase is met, that is, determine whether to enter the second interaction phase from the first interaction phase.

In a first aspect, the decision state machine module may determine, based on a magnitude relationship between a decision benefit difference between a decision solution with the first highest decision benefit and a decision solution with the second highest decision benefit in the decision solution set and a threshold benefit difference, whether the condition for entering the second interaction stage is met.

In a case, when the decision benefit difference between the decision solution with the first highest decision benefit and the decision solution with the second highest decision benefit in the decision solution set is not less than the threshold benefit difference, the decision state machine module determines that the condition for entering the second interaction phase is met.

It may be understood that, when the decision benefit difference between the decision solution (for example, a decision solution A) with the first highest decision benefit and the decision solution (for example, a decision solution B) with the second highest decision benefit in the decision solution set is less than the threshold benefit difference, it indicates that a benefit difference between game interaction by using the decision solution A and game interaction by using the decision solution B is relatively small. In this case, the decision state machine module cannot determine whether the decision solution A or the decision solution B is more suitable for the current game, the decision state machine module may determine that a current interaction relationship between the ego vehicle and the game target is unclear, and the first interaction phase needs to be entered.

In another case, when the decision benefit difference between the decision solution with the first highest decision benefit and the decision solution with the second highest decision benefit in the decision solution set is less than the threshold benefit difference, the decision state machine module determines that the condition for entering the second interaction stage is not met.

It may be understood that, when the decision benefit difference between the decision solution (for example, a decision solution A) with the first highest decision benefit and the decision solution (for example, a decision solution B) with the second highest decision benefit in the decision solution set is not less than the threshold benefit difference, for example, the decision benefit difference between the decision benefit of the decision solution A and the decision benefit of the decision solution B is higher than the threshold benefit difference, it indicates that the decision solution A is appropriate to perform this game interaction. In this case, the decision state machine module can determine that the decision solution A is more suitable for this game, therefore, the decision state machine module may determine that a current interaction relationship between the ego vehicle and the game target is clear, and the second interaction phase needs to be entered.

For example, it is assumed that the threshold benefit difference is 0.03, and the first echelon includes an optimal decision solution 1 and an optimal decision solution 2. It is assumed that currently the decision state machine module determines that a decision benefit of the optimal decision solution 1 is 0.81, and a decision benefit of the optimal decision solution 2 is 0.77. The decision benefit of the optimal decision solution 1 is 0.04 higher than the decision benefit of the optimal decision solution 2, and the decision benefit difference exceeds the threshold benefit difference 0.03.

In this case, the decision state machine module may determine that currently the decision benefit of the optimal decision solution 1 in the first echelon is obviously higher than the decision benefit of the optimal decision solution 2. The decision state machine module may determine that the optimal decision solution 1 is more suitable for the current game, the second interaction phase is entered, and the optimal decision solution 1 is selected as a second decision solution for traveling.

In a second aspect, the decision state machine module may determine, based on a comparison result between an actual moving track of the game target at a predetermined moment and a track of the game target that is predicted by using a first decision solution, whether the condition for entering the second interaction phase is met.

In a case, when the decision state machine module determines that the actual moving track of the game target at the predetermined moment is relatively highly consistent with the moving track of the game target at the predetermined moment that is predicted by using the first decision solution, the decision state machine module determines that the condition for entering the second interaction phase is met. In this case, the first decision solution used in the first interaction phase is the same as the second decision solution used in the second interaction phase.

It may be understood that, when the decision state machine module determines that the actual moving track of the game target at the predetermined moment is consistent with the moving track of the game target at the predetermined moment that is predicted by using the first decision solution (for example, a decision solution A), it indicates that the moving track of the game target completely conforms to an expectation of the decision solution, and it means that the decision solution A currently used for game interaction can be used. In this case, the decision state machine module can determine that the decision solution A is suitable for the game. Therefore, the decision state machine module may determine that a current interaction relationship between the ego vehicle and the game target is clear, and therefore the second interaction phase is entered. Because the decision state machine module determines that the decision solution A is suitable for the current game, when entering the second interaction phase, the decision state machine module may continue to use the decision solution A as the second decision solution for executing the second interaction phase.

In another case, when the decision state machine module determines that the actual moving track of the game target at the predetermined moment is inconsistent with the moving track of the game target at the predetermined moment that is predicted by using the first decision solution, the decision state machine module determines that the condition for entering the second interaction phase is met. In this case, the first decision solution used in the first interaction phase is different from the second decision solution used in the second interaction phase.

It may be understood that, when the decision state machine module determines that the actual moving track of the game target at the predetermined moment is inconsistent with the moving track of the game target at the predetermined moment that is predicted by using the first decision solution (for example, a decision solution A), it indicates that the moving track of the game target is completely unexpected, which means that the decision solution A currently used for game interaction is not applicable. In this case, the decision state machine module needs to adjust the decision solution A used for game interaction to a decision solution (for example, a decision solution B) that is more suitable for the current game. The decision solution B may be obtained from the decision solution set. For example, if the ego vehicle currently finds that a policy of rushing without avoidance is no longer applicable (the game target may not yield as expected, but rushes without decelerating), a more appropriate decision solution, for example, yielding with avoidance, may be obtained from the decision solution set. After the decision solution B is determined, the decision state machine module may determine that a current interaction relationship between the ego vehicle and the game target is clear, and the second interaction phase is entered.

Further, the decision state machine module may further combine the first aspect and the second aspect, which are jointly used to determine whether the condition for entering the second interaction phase is met.

When it is determined, by combining the first aspect and the second aspect, whether the condition for entering the second interaction phase is met, if a result of determining whether the condition for entering the second interaction phase is met based on the first aspect is inconsistent with a result of determining whether the condition for entering the second interaction phase is met based on the second aspect, the result of determining whether the condition for entering the second interaction phase is met based on the second aspect is used, that is, a priority of the second aspect is higher than a priority of the first aspect. A reason for this setting is as follows: It should be noted that a consistency/inconsistency jump is usually caused by the game target not complying with a traffic rule or a general driving habit, and may be contrary to an evaluation of a cost, and a priority of the consistency/inconsistency jump is higher than that of a benefit-based jump.

For example, the decision state machine module determines, based on the second aspect, that the actual moving track of the game target at the predetermined moment is inconsistent with the moving track of the game target at the predetermined moment that is predicted by using the first decision solution, and the second interaction phase needs to be entered. In this case, the decision state machine module learns, through determining based on the first aspect, that the decision benefit difference between the decision solution A with the first highest decision benefit and the decision solution B with the second highest decision benefit in the decision solution set is less than the threshold benefit difference, and the second interaction phase does not need to be entered. Because the priority of the second aspect is higher than the priority of the first aspect, the decision state machine module mainly determines, based on the result of the determining in the second aspect, that the second interaction phase needs to be entered.

In addition, in this embodiment of this application, in addition to the foregoing two aspects, whether the condition for entering the second interaction phase is met may be further determined in another manner or in combination with another manner.

For example, the decision state machine module may determine, based on interaction duration of the first interaction phase, whether to enter the second interaction phase.

In some embodiments, after determining to enter the first interaction phase, the decision state machine module starts a corresponding timer, where timing duration of the timer is threshold duration. When the decision state machine module determines that the timer expires, the decision state machine module determines that the condition for entering the second interaction phase is met, and enters the second interaction phase.

For example, it is assumed that the threshold duration is 10 s. If the decision state machine module determines that duration of entering the first interaction phase exceeds 10 s, the decision state machine module enters the second interaction phase.

For another example, the decision state machine module may determine, based on a distance between the ego vehicle and the game target, whether to enter the second interaction phase.

In some embodiments, after the decision state machine module determines to enter the first interaction phase, with continuous interaction, a distance between the ego vehicle and the game target may become smaller. When the decision state machine module determines that the distance between the ego vehicle and the game target is less than a threshold distance, the decision state machine module determines that the condition for entering the second interaction phase is met, and enters the second interaction phase.

In some embodiments, the decision state machine module may determine consistency or inconsistency based on lateral and longitudinal action sequences of the game target.

Based on the second aspect, when the decision state machine module determines whether the predicted track of the game target at the predetermined moment is consistent with the real track of the game target at the predetermined moment, the decision state machine module may determine a future status (that is, the predicted track) of the game target at the predetermined moment based on a continuous historical status change and based on an action sequence of the game target that is predicted according to a decision solution selected for interaction at each moment and an actual action sequence of the game target, where a lateral direction and a longitudinal direction may be distinguished in the determining process.

For example, the game target is a bicycle. An expected acceleration sequence and an actual acceleration sequence are processed by using a statistical data processing method, to obtain a longitudinal action sequence shown in (a) in FIG. 11.

Figure 11:
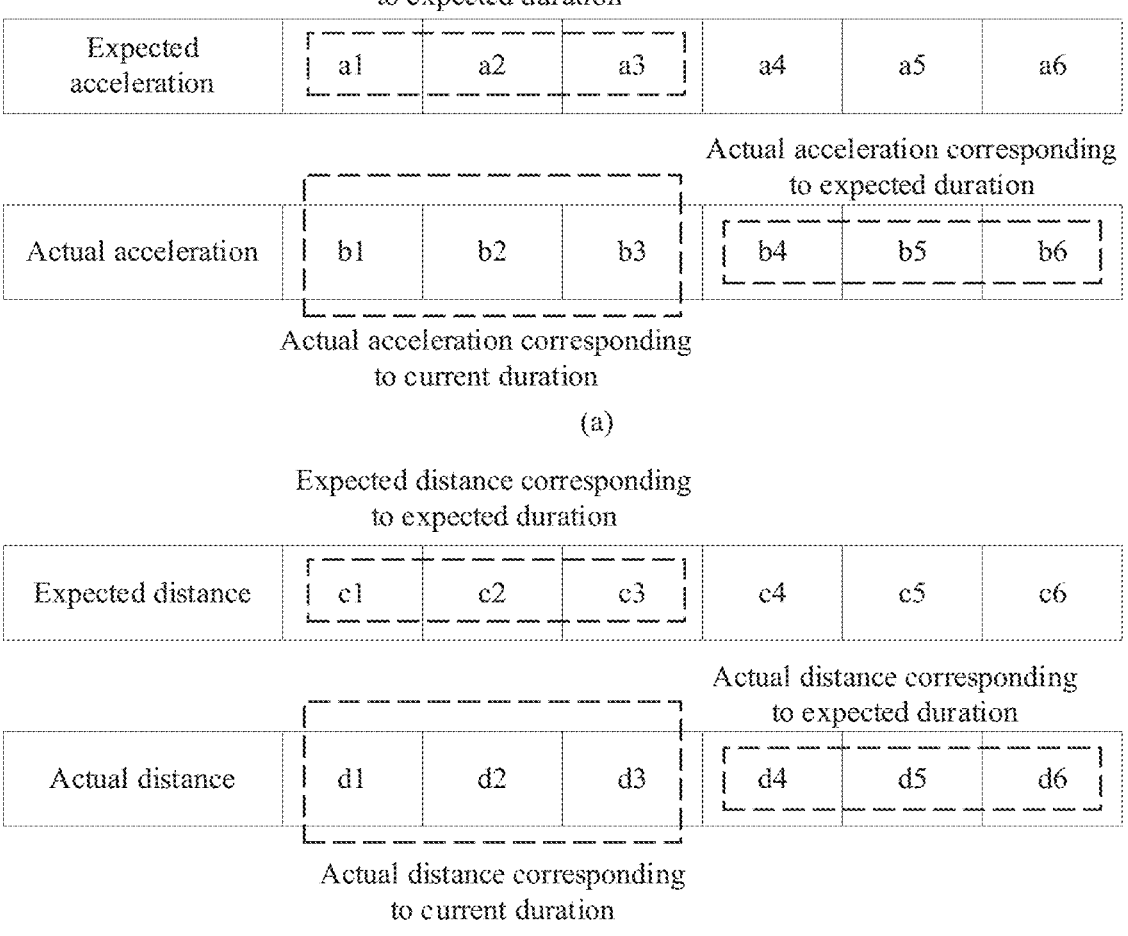
FIG. 11 is a schematic diagram of a consistency determining scenario according to this application.

According to content shown in (a) in FIG. 11, it can be learned that a1 to a3 are changes of an expected acceleration of the game target in expected duration that are determined by the decision state machine module, b1 to b3 are changes of an actual acceleration of the game target in current duration, and b4 to b6 are changes of an actual acceleration of the game target in the expected duration. If differences between a1 to a3 and b4 to b6 exceed a threshold range, the decision state machine module determines that a tracking result of the game target at a predetermined moment is inconsistent with a moving track of the game target at the predetermined moment that is predicted by using the first decision solution. If the difference between a1 to a3 and b4 to b6 fluctuates within the threshold range, the decision state machine module determines that the tracking result of the game target at the predetermined moment is consistent with the moving track of the game target at the predetermined moment that is predicted by using the first decision solution.

For example, the game target is a bicycle. A statistical data processing method is used to process an expected distance sequence and an actual distance sequence, to obtain a lateral action sequence shown in (b) in FIG. 11. Because a lateral action change is usually irreversible, determining of lateral consistency/inconsistency is affected by a historical determining result.

According to content shown in (b) in FIG. 11, it can be learned that c1 to c3 are changes of an expected distance of the game target in expected duration that are determined by the decision state machine module, d1 to d3 are changes of an actual distance of the game target in current duration, and d4 to d6 are changes of an actual distance of the game target in the expected duration. If differences between c1 to c3 and d4 to d6 exceed a threshold range, the decision state machine module determines that a tracking result of the game target at a predetermined moment is inconsistent with a moving track of the game target at the predetermined moment that is predicted by using the first decision solution. If a difference between c1 to c3 and d4 to d6 fluctuates within the threshold range, the decision state machine module determines that the tracking result of the game target at the predetermined moment is consistent with the moving track of the game target at the predetermined moment that is predicted by using the first decision solution.

The motion planning module needs to perform a corresponding operation based on the decision solutions in the first interaction phase and the second interaction phase.

The system architecture and application scenarios described in embodiments of this application are intended to describe the technical solutions in embodiments of this application more clearly, and do not constitute a limitation on the technical solutions provided in embodiments of this application.

In addition, a person of ordinary skill in the art may learn that the technical solutions provided in embodiments of this application are also applicable to a similar technical problem as a vehicle architecture evolves and a new service scenario emerges. It should be understood that FIG. 2 to FIG. 5 are merely simplified schematic diagrams of examples for ease of understanding. The system architecture may further include another device or may further include another unit module.

The method provided in embodiments of this application is described below with reference to FIG. 12. The method may be executed by an electronic apparatus. The electronic apparatus may include a processing apparatus and a communication apparatus. The processing apparatus may be a field programmable gate array (field programmable gate array, FPGA), an application specific integrated chip (application specific integrated circuit, ASIC), a central processing unit (central processing unit, CPU), or the like. The electronic apparatus may include any one or more structures shown in FIG. 2 to FIG. 5.

When the intelligent driving method is being implemented, the processing module 210 shown in FIG. 2, the processor shown in FIG. 4, or the game obstacle screening module, the game target status tracking module, the game decision module, and the motion planning module shown in FIG. 5 may be used to implement processing actions in the method provided in the embodiments of this application. The collection module 230 shown in FIG. 2, the collection apparatus shown in FIG. 4, or the like may collect the perception information. The interaction includes but is not limited to obtaining perception information of an ego vehicle and perception information of a game target.

S1200: The electronic apparatus obtains a decision solution set of the ego vehicle based on perception information.

S1201: The electronic apparatus obtains, from the decision solution set, a first decision solution used for a first interaction phase between the ego vehicle and the game target.

S1202: In a process of controlling, based on the first decision solution, the ego vehicle to which the electronic apparatus belongs to travel, the electronic apparatus detects that the ego vehicle and the game target meet a condition for entering a second interaction phase.

S1203: The electronic apparatus obtains, from the decision solution set, a second decision solution used for the second interaction phase between the ego vehicle and the game target.

S1204: The electronic apparatus controls, based on the second decision solution, the ego vehicle to travel.

It may be understood that division of the first interaction phase and the second interaction phase in the intelligent driving method in this application does not constitute a limitation on this application.

For example, in this application, the decision process may be divided into three interaction phases based on an actual situation.

In some embodiments, in this embodiment of this application, the first interaction phase may be referred to as a critical state.

The critical state in this embodiment of this application may be understood as that an interaction relationship between the ego vehicle and the game target is unclear, that is, a decision solution for interaction between the ego vehicle and the game target may change at any time.

In some embodiments, in this embodiment of this application, the second interaction phase may be referred to as a confidence state.

The confidence state in this embodiment of this application may be understood as that an interaction relationship between the ego vehicle and the game target is clear, that is, a decision solution for interaction between the ego vehicle and the game target is determined.

For example, in a game process of the ego vehicle and the game target, as the game process continues, the ego vehicle approaches a decision solution. When a difference between a decision benefit of the approaching decision solution and a decision benefit of another decision solution is greater than a threshold benefit difference, it is considered that the game relationship is clear, and a transition from the critical state to the confidence state is completed.

Figure 12:
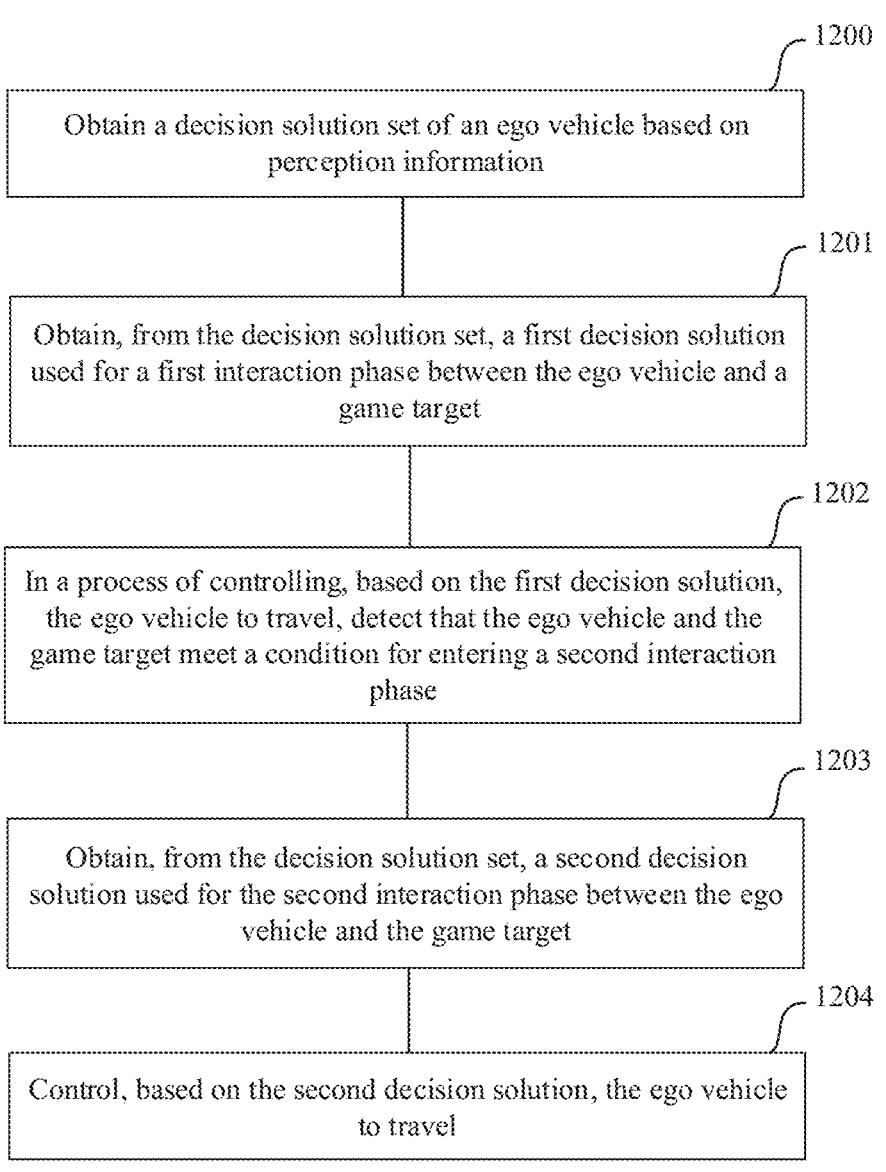
FIG. 12 is a schematic flowchart of a first intelligent driving method according to this application.
Figure 13:
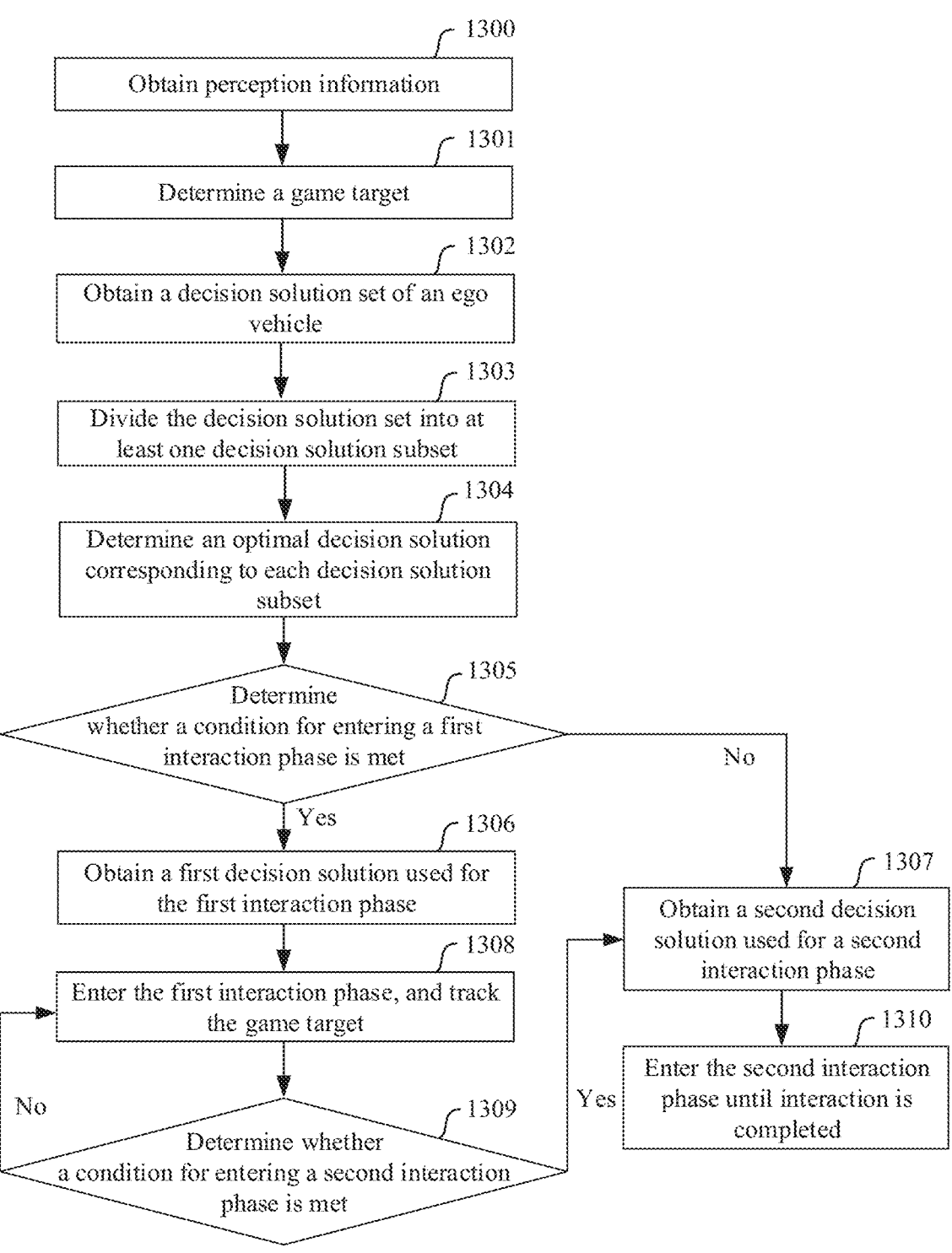
FIG. 13 is a schematic flowchart of a second intelligent driving method according to this application.

To better describe the intelligent driving method provided in this application, as shown in FIG. 13, based on the content shown in FIG. 12, further detailed descriptions are provided.

S1300: Obtain perception information.

S1301: Determine a game target based on the perception information.

For details about content of step S1301, refer to the descriptions in FIG. 6 and FIG. 7. For brevity, details are not described herein again.

S1302: Obtain a decision solution set of an ego vehicle based on the perception information.

S1303: Divide the decision solution set into at least one decision solution subset.

In some embodiments, each decision solution may include an action pair, and the action pair may include a vehicle speed, a vehicle offset direction, and the like.

In some embodiments, a decision label of a decision solution is determined based on an action pair included in the decision solution, and decision solutions that include a same decision label in the decision solution set are grouped into a decision solution subset.

Figure 14:
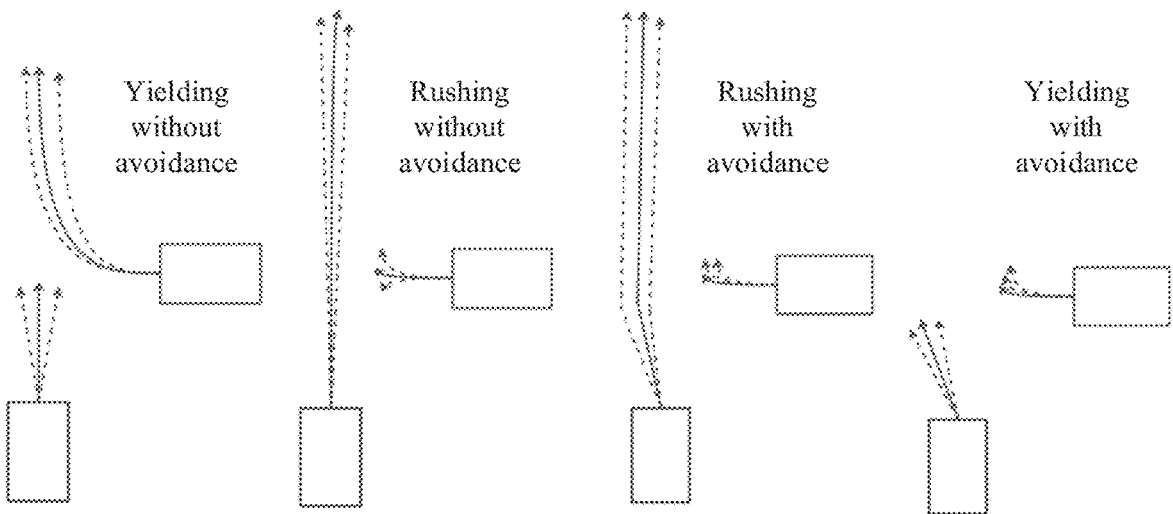
FIG. 14 is a schematic diagram of a decision solution subset according to this application.

For example, as shown in FIG. 14, a decision label is marked for each decision solution in the decision solution set. For example, in an example scenario shown in FIG. 14, after the decision label is marked for each decision solution in the decision solution set, the decision labels in the decision solution set include Yielding without avoidance, Rushing without avoidance, Rushing with avoidance, and Yielding with avoidance.

Then, decision solutions with a same decision label are grouped into one decision solution subset. In the scenario example in FIG. 14, the decision solution set is divided into four decision solution subsets: a decision solution subset whose decision label is Yielding without avoidance, a decision solution subset whose decision label is Rushing without avoidance, a decision solution subset whose decision label is Rushing with avoidance, and a decision solution subset whose decision label is Yielding with avoidance.

S1304: Determine an optimal decision solution in each decision solution subset. The optimal decision solution is a decision solution with a highest decision benefit in a corresponding decision solution subset.

For specific content of step S1304, refer to the content description in FIG. 9 and FIG. 10. For brevity, details are not described herein again.

S1305: Determine whether the ego vehicle and the game target meet a condition for entering a first interaction phase; and if yes, perform S1306, or if no, perform S1307.

For specific content of step S1306, refer to the foregoing content description of the decision state machine module. For brevity, details are not described herein again.

S1306: Obtain a first decision solution used for a first interaction phase between the ego vehicle and the game target, and continue to perform S1308.

The first decision solution used for the first interaction phase between the ego vehicle and the game target is determined based on a plurality of optimal decision solutions included in a first echelon.

Because decision benefits of the optimal decision solutions in the first echelon are not less than a threshold benefit, the first decision solution is selected from the optimal decision solutions included in the first echelon, so that the selected first decision solution can be more applicable at a current moment, and safety and comfort of interaction between the ego vehicle and the game target are ensured.

Further, to ensure that in the first interaction phase, a capability of jumping in different decision solutions may be available in a future period of time, an acceleration in the first decision solution may be further planned.

For example, when the ego vehicle rushes for the game target, rushing with a minimum acceleration can be implemented, to ensure a capability of transferring from rushing to yielding. When the ego vehicle yields for the game target, yielding with a maximum acceleration can be implemented, to ensure a capability of transferring from yielding to rushing.

Figure 15:
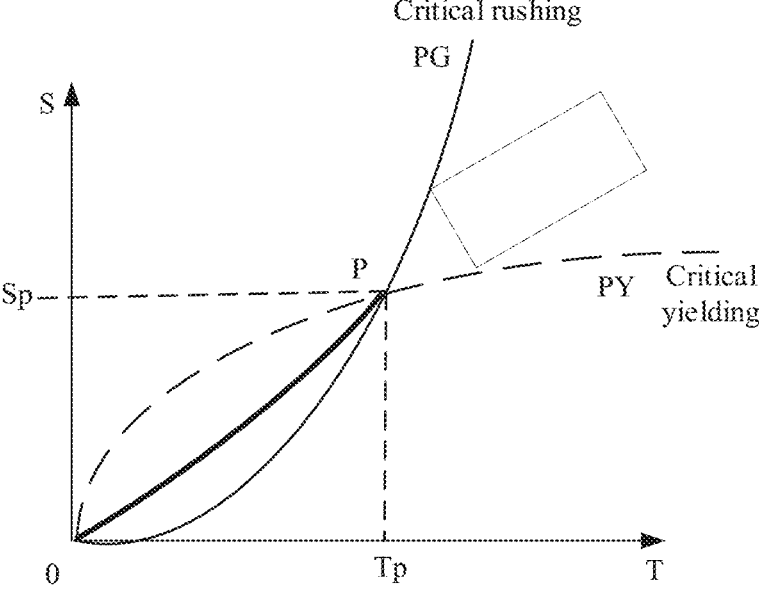
FIG. 15 is a schematic diagram of speed planning in a first interaction phase according to this application.

For example, as shown in FIG. 15, in the first interaction phase, an ST curve of a planned acceleration falls within an almond-shaped region of Sp and tp, that is, it may be understood that the planned acceleration curve of the first decision solution falls within the almond-shaped region of Sp and tp, and the planned acceleration has both a rushing policy and a yielding policy.

The SP point shown in FIG. 15 may be understood as a last separation distance point, and is used to indicate that the second interaction phase needs to be entered after the SP point. The TP point shown in FIG. 15 may be understood as a last separation time point, and is used to indicate that the second interaction phase needs to be entered after the TP point. The focus P may be understood as a critical separation point, and is used to indicate a separation point from the first interaction phase to the second interaction phase. The PG line represents a planned route for rushing, and the PY line represents a planned route for yielding.

S1308: Perform the first interaction phase with the game target by using the first decision solution, continuously track a status of the game target, and continue to perform S1309.

S1309: Determine whether the ego vehicle and the game target meet a condition for entering a second interaction phase; and if yes, perform S1307, or if no, return to S1308.

S1307: Obtain a second decision solution used for a second interaction phase between the ego vehicle and the game target, and continue to perform S1310.

In some embodiments, the second decision solution is determined from a plurality of optimal decision solutions included in the first echelon.

For example, it is assumed that the threshold benefit difference is 0.03, and the first echelon includes an optimal decision solution 1 and an optimal decision solution 2. In an initial phase of interaction between the ego vehicle and the game target, it is determined that a decision benefit of the target decision solution 1 is 0.8, and a decision benefit of the target decision solution 2 is 0.78. In this case, a difference between the decision benefit of the target decision solution 1 and the decision benefit of the target decision solution 2 is less than the threshold benefit difference 0.03. In this case, which decision solution is more suitable for this game cannot be determined, and the first interaction phase needs to be entered. It is assumed that the optimal decision solution 1 is determined as the first decision solution in the first interaction phase.

As the interactive game proceeds, when it is determined that a decision benefit of a target decision solution in the first echelon is obviously higher than that of another target decision solution, the second interaction phase is entered. For example, at a moment, the decision benefit of the optimal decision solution 1 is 0.78, the decision benefit of the optimal decision solution 2 is 0.82, the decision benefit of the optimal decision solution 2 is 0.04 higher than the decision benefit of the optimal decision solution 1, and the difference exceeds the threshold benefit difference 0.03. In this case, it may be determined that currently the decision benefit of the optimal decision solution 2 in the first echelon is obviously higher than the decision benefit of the optimal decision solution 1, and the electronic apparatus may determine that the optimal decision solution 2 is more suitable for the game, enter the second interaction phase, and select the target decision solution 2 as the second decision solution for traveling.

As described above, in this embodiment of this application, there are a plurality of reasons for jumping from the first interaction phase to the second interaction phase, and the following cases may be included.

Figure 16:
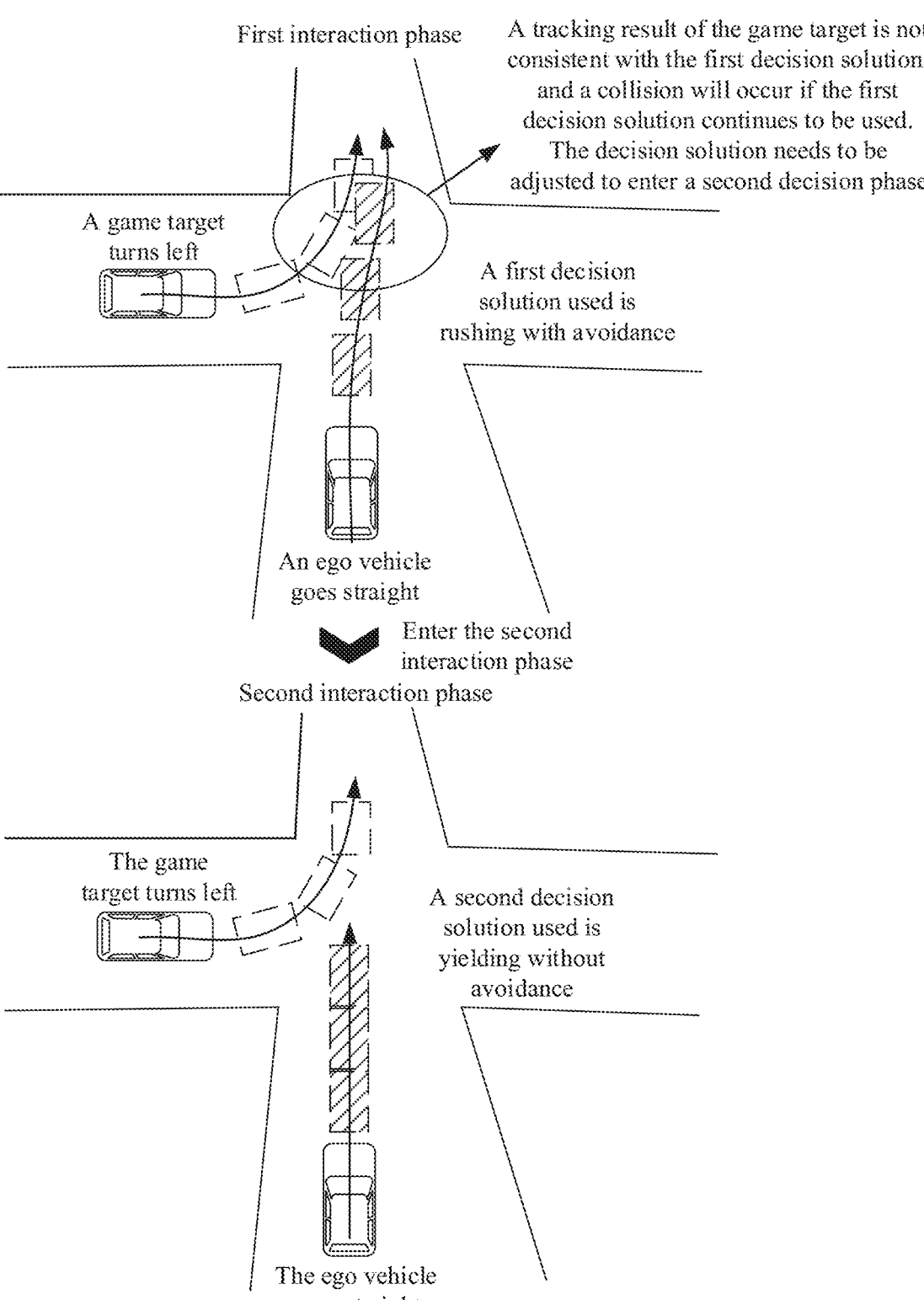
FIG. 16 is a schematic diagram of a scenario of switching from a first interaction phase to a second interaction phase according to this application.

It is assumed that a current scenario is shown in FIG. 16, and is a scenario in which the ego vehicle goes straight and a vehicle is about to merge at an intersection.

According to the foregoing method, it is assumed that the first echelon includes a decision solution subset of rushing with avoidance and a decision solution subset of yielding without avoidance. The target decision solution of rushing with avoidance can ensure good passability, and the target decision solution of yielding without avoidance can ensure good safety. A difference between a decision benefit of the optimal decision solution 1 of rushing with avoidance and a decision benefit of the optimal decision solution 2 of yielding without avoidance is less than a threshold benefit difference.

In the first interaction phase, a decision solution that is selected from the first echelon and that is used as the first decision solution is rushing with avoidance (that is, the optimal decision solution 1 that may represent rushing with avoidance is selected). In a process of the first interaction phase with the game target, a status of the game target is continuously tracked. If it is determined that a tracking result of the game target is inconsistent with that predicted by using the first decision solution, a decision solution suitable for a current status of the game target is obtained from the decision solution set (for example, yielding without avoidance is selected), and the interaction jumps from the first interaction phase to the second interaction phase.

In some embodiments, a jump from the first decision solution in the first interaction phase to the second decision solution in the second interaction phase is implemented. The first decision solution is the same as the second decision solution.

Figure 17:
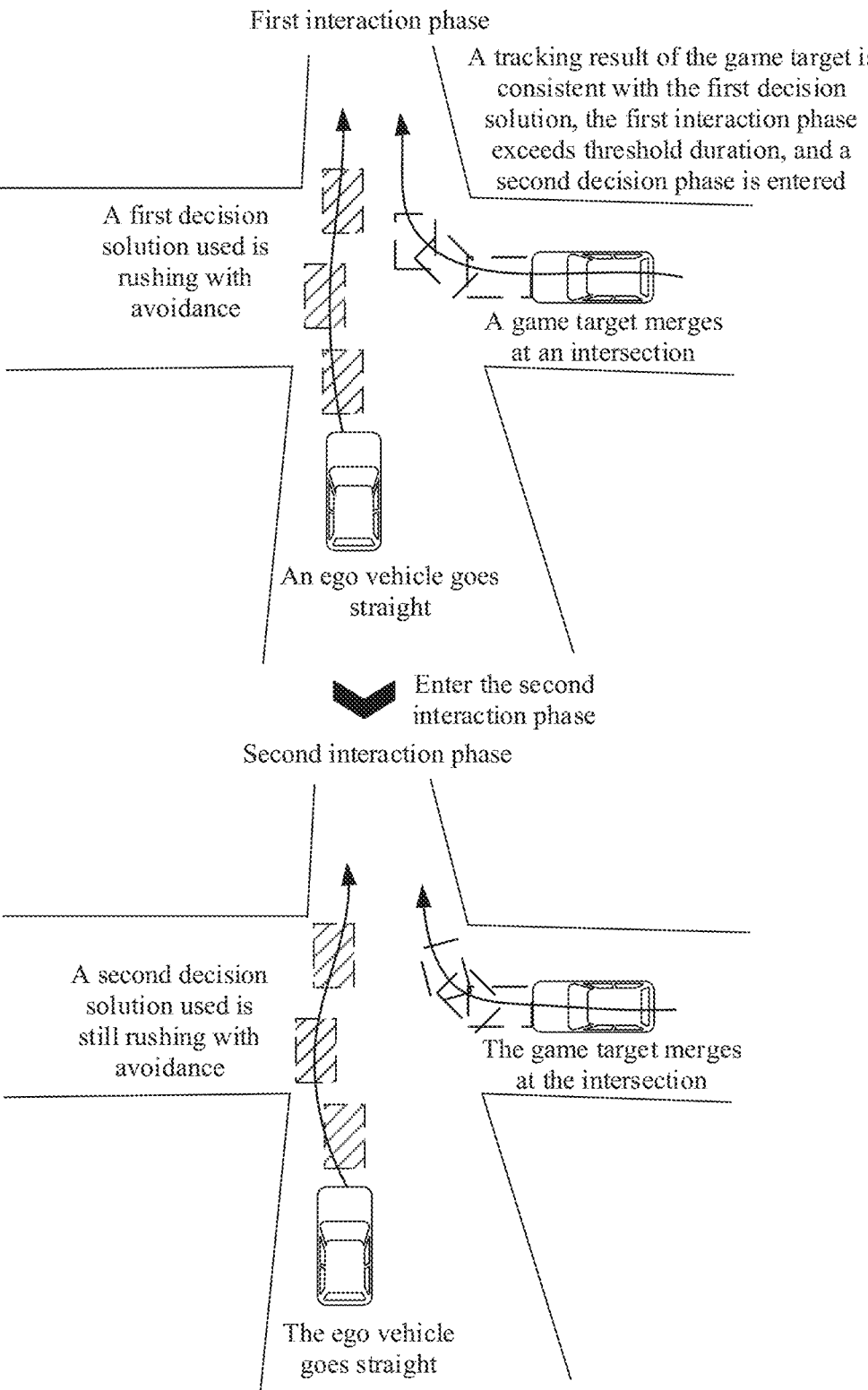
FIG. 17 is a schematic diagram of another scenario of switching from a first interaction phase to a second interaction phase according to this application.

It is assumed that a current scenario is shown in FIG. 17, and is a scenario in which the ego vehicle goes straight and a vehicle is about to merge at an intersection. According to the foregoing method, it is assumed that the first echelon includes an optimal decision solution 1 of rushing with avoidance and an optimal decision solution 2 of yielding without avoidance. The optimal decision solution 1 of rushing with avoidance can ensure good passability, and the optimal decision solution 2 of yielding without avoidance can ensure good safety. A difference between a decision benefit of the optimal decision solution 1 of rushing with avoidance and a decision benefit of the optimal decision solution 2 of yielding without avoidance is less than a threshold benefit difference.

In the first interaction phase, a decision solution that is selected from the first echelon and that is used as the first decision solution is rushing with avoidance (that is, the optimal decision solution 1 that may represent rushing with avoidance is selected). In a process of performing the first interaction phase with the game target, a status of the game target is continuously tracked. If it is determined that a tracking result of the game target is always consistent with the first decision solution, it is determined that the interaction jumps from the first interaction phase to the second interaction phase, and the target decision solution of rushing with avoidance in the first echelon continues to be used as the second decision solution for traveling until the interaction is completed.

In some embodiments, if a benefit of the used interaction policy is greater than a benefit of another decision solution in the decision solution set by a specified threshold (for example, greater than 10% of the benefit of the current interaction policy) in the first interaction phase, state jumping may be triggered, that is, the interaction jumps from the first interaction phase to the second interaction phase.

S1310: The electronic apparatus performs the second interaction phase with the game target by using the second decision solution until interaction is completed.

According to the procedure shown in FIG. 13, the intelligent driving method provided in the embodiments of this application may be implemented by using any one of the electronic apparatuses shown in FIG. 2 to FIG. 5.

It should be understood that, for the embodiment of the steps implemented by the electronic apparatus shown in FIG. 13, according to the intelligent driving method provided in the embodiments of this application, some steps shown in FIG. 13 may be omitted, or some steps in FIG. 12 may be replaced with other steps, or the electronic apparatus may further perform some steps not shown in FIG. 13.

Based on the foregoing content and a same concept, this application further provides an electronic apparatus, configured to implement functions of the electronic apparatus in the intelligent driving method described in the foregoing method embodiments. Therefore, the electronic apparatus has beneficial effects of the foregoing method embodiments. The electronic apparatus may include any structure in FIG. 2 to FIG. 5, or may be implemented by a combination of any multiple structures in FIG. 2 to FIG. 5.

The electronic apparatus shown in FIG. 2 may be a terminal or a vehicle, or may be a chip inside a terminal or a vehicle. The electronic apparatus may implement the intelligent driving method shown in FIG. 12 or FIG. 13 and the foregoing optional embodiments. The electronic apparatus may include the processing module 210 and the communication module 220.

The processing module 210 may be configured to perform any one of steps S1200 to S1204 in the method shown in FIGS. 11 and S1300 to S1310 in the method shown in FIG. 13, or may be configured to perform any one of steps such as determining whether to enter the first interaction phase, determining whether to enter the second interaction phase, and determining a decision solution in the foregoing optional embodiments. The collection module 230 is configured to collect perception information. For example, the collection module 230 may be configured to perform S1300 and the like in the method shown in FIG. 13, or may be configured to perform any step related to perception information obtaining in the foregoing optional embodiments. For details, refer to detailed descriptions in the method example. Details are not described herein again.

The processing module 210 is configured to: obtain a decision solution set of an ego vehicle based on the perception information; obtain, from the decision solution set, a first decision solution used for a first interaction phase between the ego vehicle and a game target; in a process of controlling, based on the first decision solution, the ego vehicle to travel, detect that the ego vehicle and the game target meet a condition for entering a second interaction phase; obtain, from the decision solution set, a second decision solution used for a second interaction phase between the ego vehicle and the game target; and control, based on the second decision solution, the ego vehicle to travel.

It should be understood that the electronic apparatus in the embodiments of this application may be implemented by software, for example, implemented by a computer program having the foregoing functions or by instructions. The corresponding computer program or instructions may be stored in a memory in the terminal. A processor reads the corresponding computer program or instructions in the memory, to implement the foregoing functions of the processing module 210 and/or the communication module 220 and/or the collection module 230. Alternatively, the electronic apparatus in the embodiments of this application may be implemented by hardware. The processing module 210 may be a processor (for example, a processor in a CPU or a system chip), and the collection module 230 may include one or more of a camera apparatus and a perception apparatus.

In an optional manner, the first decision solution is a decision solution used when an interaction relationship between the ego vehicle and the game target is unclear, and the second decision solution is a decision solution used when the interaction relationship between the ego vehicle and the game target is clear.

In an optional manner, the processing module 210 is further configured to continuously track a status of the game target in a process of the first interaction phase between the ego vehicle and the game target.

In an optional manner, the condition for entering the second interaction phase includes at least one of the following:

duration of the first interaction phase exceeds threshold duration; a decision benefit difference between a decision solution with the first highest decision benefit in the decision solution set and a decision solution with the second highest decision benefit is not less than a threshold benefit difference; an actual moving track of the game target at a predetermined moment is inconsistent with the first decision solution; an actual moving track of the game target at a predetermined moment is consistent with the first decision solution; or a distance between the ego vehicle and the game target is less than a threshold distance.

In an optional manner, the processing module 210 is further configured to:

determine at least one target based on the perception information, and obtain a future moving track of the at least one target; and determine a target, in the at least one target, whose future moving track intersects a future moving track of the ego vehicle as the game target.

In an optional manner, the processing module 210 is configured to:

obtain lateral position offset sampling dimensions and longitudinal acceleration sampling dimensions of the ego vehicle and the game target based on the perception information; and obtain the decision solution set based on the lateral position offset sampling dimensions and the longitudinal acceleration sampling dimensions.

In an optional manner, the processing module 210 is configured to:

obtain the lateral position offset sampling dimensions of the ego vehicle and the game target based on the perception information and a first factor; and obtain the longitudinal acceleration sampling dimensions of the ego vehicle and the game target based on the perception information and a second factor, where the first factor includes at least one of a road boundary and a static obstacle in an environment in which the ego vehicle is located, and the second factor includes at least one of a road speed limit in the environment in which the ego vehicle is located, an acceleration change rate, and a game target type.

In an optional manner, the processing module 210 is configured to:

obtain at least one decision solution subset by dividing the decision solution set, where each decision solution subset includes at least one decision solution; determine a target decision solution corresponding to each decision solution subset, where the target decision solution is a decision solution with a highest decision benefit in the corresponding decision solution subset; and obtain, from at least one target decision solution, the first decision solution used for the first interaction phase between the ego vehicle and the game target.

In an optional manner, the processing module 210 is configured to:

classify a target decision solution whose decision benefit is not less than a threshold benefit in the at least one target decision solution into a first echelon, and classify a target decision solution whose decision benefit is less than the threshold benefit in the at least one target decision solution into a second echelon; and determine, from the target decision solution included in the first echelon, the first decision solution used for the first interaction phase between the ego vehicle and the game target.

In an optional manner, the processing module 210 is further configured to:

obtain, from the target decision solution included in the first echelon, the second decision solution used for the second interaction phase between the ego vehicle and the game target.

In an optional manner, the processing module 210 is configured to:

determine a decision benefit corresponding to each decision solution in the decision solution subset according to a benefit evaluation system; and determine a decision solution with a highest decision benefit in the decision solution subset as the target decision solution corresponding to the decision solution subset, where the benefit evaluation system includes at least one dimension of safety, comfort, passability, a right of way, a risk area, and an offset of a decision solution.

In an optional manner, the benefit evaluation system further includes a historical decision result.

In an optional manner, each decision solution includes one action pair group, and the action pair group includes a vehicle acceleration and a vehicle offset direction.

In an optional manner, the processing module 210 is configured to:

determine, based on a correspondence between a traveling environment and a benefit evaluation system, the benefit evaluation system used for interaction; and determine, according to the benefit evaluation system used for interaction, the decision benefit corresponding to each decision solution in the decision solution subset.

In a possible design, the processing module 210 is further configured to determine that the ego vehicle and the game target meet a condition for entering the first interaction phase, where the condition for entering the first interaction phase includes that a decision benefit difference between any two target decision solutions in the first echelon is less than a threshold benefit difference.

In a possible design, the processing module 210 is further configured to: if a difference between a decision benefit of a target decision solution in the first echelon and a decision benefit of each remaining target decision solution in the first echelon is greater than a threshold benefit difference, determine to perform the second phase.

In a possible design, the processing module 210 is further configured to adjust a decision solution used in the first interaction phase when determining, in the first interaction phase, that a tracking result of the game target at a predetermined moment is inconsistent with a moving track at the predetermined moment that is predicted by using the first decision solution.

In a possible design, the first decision solution is the same as the second decision solution.

It should be understood that for processing details of the electronic apparatus in this embodiment of this application, refer to related descriptions in FIG. 12, FIG. 13, and the method embodiments of this application. Details are not described herein again.

The electronic apparatus shown in FIG. 4 may be a vehicle. The vehicle control apparatus may implement the intelligent driving method shown in FIG. 12 or FIG. 13 and the foregoing optional embodiments. The electronic apparatus may include at least one of a processor, a memory, an interface circuit, or a human-computer interaction apparatus. It should be understood that FIG. 4 shows only one processor, one memory, one interface circuit, and one (or one type of) collection apparatus. The electronic apparatus may include another quantity of processors and another quantity of interface circuits.

The interface circuit is configured to connect the electronic apparatus to a terminal or another component of the vehicle, for example, a memory, another processor, or a projection apparatus. The processor is configured to perform signal interaction with another component through the interface circuit. The interface circuit may be an input/output interface of the processor.

For example, the processor reads, through the interface circuit, a computer program or instructions in the memory coupled to the processor, and decodes and executes the computer program or the instructions. It should be understood that the computer program or the instructions may include the foregoing function program, or may include the foregoing function program of the electronic apparatus. When the corresponding function program is decoded and executed by the processor, the electronic apparatus can be enabled to implement the solutions in the intelligent driving method provided in the embodiments of this application.

In some embodiments, these function programs are stored in a memory outside the electronic apparatus. In this case, the electronic apparatus may not include the memory. When the function programs are decoded and executed by the processor, the memory temporarily stores some or all content of the function programs.

In some embodiments, these function programs are stored in a memory inside the electronic apparatus. When the memory in the electronic apparatus stores the foregoing function programs, the electronic apparatus may be disposed in the electronic apparatus in the embodiments of this application.

In some embodiments, these function programs are stored in a memory outside the road condition television apparatus, and other parts of these function programs are stored in a memory inside the electronic apparatus.

It should be understood that the processor may be a chip. For example, the processor may be a field programmable gate array (field programmable gate array, FPGA), an application specific integrated circuit (application specific integrated circuit, ASIC), a system on chip (system on chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

It should be understood that when the electronic apparatus is implemented by using the structure shown in FIG. 4, the memory may store a computer program or instructions, and the processor executes the computer program or the instructions stored in the memory, to perform the action performed by the processing module 210 when the electronic apparatus is implemented by using the structure shown in FIG. 2. The collection apparatus may perform the action of collecting perception information when the electronic apparatus is implemented by using the structure shown in FIG. 2. In some embodiments, the processor and the memory shown in FIG. 4 may be used to implement the processing module 210 shown in FIG. 2; or the processing module 210 shown in FIG. 2 includes the processor and the memory; or the processor executes a computer program or instructions stored in the memory, to implement the action performed by the processing module 210 shown in FIG. 2; and/or the collection apparatus shown in FIG. 4 may implement the collection module 230 shown in FIG. 2; or the processing module 210 shown in FIG. 2 includes the collection apparatus shown in FIG. 4; or the collection apparatus performs the action performed by the collection module 230 shown in FIG. 2.

When the electronic apparatus is implemented by using the structure shown in FIG. 5, one or more of the game obstacle screening module, the game target status tracking module, the game decision module, and the motion planning module may perform actions performed by the processing module 210 when the electronic apparatus is implemented by using the structure shown in FIG. 2. When the electronic apparatus is implemented by using the structure shown in FIG. 5, for actions respectively performed by the game obstacle screening module, the game target status tracking module, the game decision module, and the motion planning module, refer to descriptions in the procedure shown in FIG. 12 and/or FIG. 13. Details are not described herein again.

It should be understood that structures of the electronic apparatuses shown in FIG. 2 to FIG. 5 may be combined with each other. For related design details of the electronic apparatuses shown in FIG. 2 to FIG. 5 and the optional embodiments, refer to each other, or refer to the intelligent driving method shown in any one of FIG. 2 to FIG. 5 and related design details of the optional embodiments. Details are not repeated again.

Based on the foregoing content and a same concept, this application provides a computing device, including a processor. The processor is connected to a memory, the memory is configured to store a computer program or instructions, and the processor is configured to execute the computer program stored in the memory, so that the computing device performs the method in the foregoing method embodiment.

Based on the foregoing content and a same concept, this application provides a computer-readable storage medium. The computer-readable storage medium stores a computer program or instructions. When the computer program or the instructions are executed, a computing device is enabled to perform the method in the foregoing method embodiment.

Based on the foregoing content and a same concept, this application provides a computer program product. When a computer executes the computer program product, a computing device is enabled to perform the method in the foregoing method embodiment.

Based on the foregoing content and a same concept, this application provides a chip. The chip is connected to a memory, and is configured to read and execute a computer program or instructions stored in the memory, so that a computing device performs the method in the foregoing method embodiment.

Based on the foregoing content and a same concept, an embodiment of this application provides an apparatus. The apparatus includes a processor and an interface circuit. The interface circuit is configured to receive a computer program or instructions and transmit the computer program or the instructions to the processor. The processor runs the computer program or the instructions to perform the method in the foregoing method embodiment.

Based on the foregoing content and a same concept, an embodiment of this application provides a vehicle. The vehicle includes a perception module, configured to obtain perception information; and a processing module, configured to: obtain a decision solution set of an ego vehicle based on the perception information; obtain, from the decision solution set, a first decision solution used for a first interaction phase between the ego vehicle and a game target; in a process of controlling, based on the first decision solution, the ego vehicle to travel, detect that the ego vehicle and the game target meet a condition for entering a second interaction phase; obtain, from the decision solution set, a second decision solution used for a second interaction phase between the ego vehicle and the game target; and control, based on the second decision solution, the ego vehicle to travel.

In some embodiments, in embodiments of this application, division into modules is used as an example, and is merely logical function division. In actual implementation, another division manner may be used. In addition, function modules in embodiments of this application may be integrated into one processor, or each of the modules may exist alone physically, or two or more modules are integrated into one module. The integrated module may be implemented in a form of hardware, or may be implemented in a form of a software function module.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An intelligent driving method, comprising:
obtaining a decision solution set of an ego vehicle based on perception information;
obtaining, from the decision solution set, a first decision solution used for a first interaction phase between the ego vehicle and a game target;
while controlling the ego vehicle to travel based on the first decision solution, determining that the ego vehicle and the game target meet a condition for entering a second interaction phase;
obtaining, from the decision solution set, a second decision solution used for the second interaction phase between the ego vehicle and the game target; and
controlling, based on the second decision solution, the ego vehicle to travel.

2. The method according to claim 1, wherein the first interaction phase is a phase in which an interaction relationship between the ego vehicle and the game target is unclear, and the second interaction phase is a phase in which an interaction relationship between the ego vehicle and the game target is clear.

3. The method according to claim 1, wherein the method further comprises:
continuously tracking a status of the game target in a process of the first interaction phase between the ego vehicle and the game target.

4. The method according to claim 1, wherein the condition for entering the second interaction phase comprises one of the following:
duration of the first interaction phase exceeds threshold duration;
a decision benefit difference between a decision solution with a relatively highest decision benefit in the decision solution set and any other decision solution in the decision solution set is not less than a threshold benefit difference;
an actual moving track of the game target at a predetermined moment is inconsistent with the first decision solution;
an actual moving track of the game target at a predetermined moment is consistent with the first decision solution; or
a distance between the ego vehicle and the game target is less than a threshold distance.

5. The method according to claim 1, wherein the method further comprises:
determining at least one target based on the perception information;
obtaining a future moving track of the at least one target;
obtaining a future moving track of the ego vehicle; and
determining a target from the at least one determined target, whose future moving track intersects the future moving track of the ego vehicle as the game target.

6. The method according to claim 1, wherein the obtaining a decision solution set of an ego vehicle based on perception information comprises:
obtaining lateral position offset sampling dimensions and longitudinal acceleration sampling dimensions of the ego vehicle and the game target based on the perception information; and
obtaining the decision solution set based on the lateral position offset sampling dimensions and the longitudinal acceleration sampling dimensions.

7. The method according to claim 6, wherein the obtaining lateral position offset sampling dimensions and longitudinal acceleration sampling dimensions of the ego vehicle and the game target based on the perception information comprises:
obtaining the lateral position offset sampling dimensions of the ego vehicle and the game target based on the perception information and a first factor; and
obtaining the longitudinal acceleration sampling dimensions of the ego vehicle and the game target based on the perception information and a second factor, wherein:
the first factor comprises at least one of a road boundary or a static obstacle in an environment in which the ego vehicle is located, and the second factor comprises at least one of a road speed limit in the environment in which the ego vehicle is located or an acceleration change rate.

8. The method according to claim 1, wherein the obtaining, from the decision solution set, a first decision solution used for a first interaction phase between the ego vehicle and a game target comprises:

obtaining at least one decision solution subset by dividing the decision solution set, wherein each decision solution subset comprises at least one decision solution;

determining an optimal decision solution of each decision solution subset, wherein the optimal decision solution is a decision solution with a relatively highest decision benefit in the corresponding decision solution subset; and obtaining, from at least one optimal decision solution, the first decision solution used for the first interaction phase between the ego vehicle and the game target.

9. The method according to claim 8, wherein the obtaining, from at least one optimal decision solution, the first decision solution used for the first interaction phase between the ego vehicle and the game target comprises:

classifying an optimal decision solution whose decision benefit is not less than a threshold benefit in the at least one optimal decision solution into a first echelon, and classifying an optimal decision solution whose decision benefit is less than the threshold benefit in the at least one optimal decision solution into a second echelon; and determining, from the optimal decision solution comprised in the first echelon, the first decision solution used for the first interaction phase between the ego vehicle and the game target.

10. The method according to claim 9, wherein the method further comprises:

obtaining, from the optimal decision solution comprised in the first echelon, the second decision solution used for the second interaction phase between the ego vehicle and the game target.

11. The method according to claim 8, wherein the determining an optimal decision solution corresponding to each decision solution subset comprises:

determining a decision benefit corresponding to each decision solution in the decision solution subset according to a benefit evaluation system; and determining a decision solution with a relatively highest decision benefit in the decision solution subset as the optimal decision solution corresponding to the decision solution subset, wherein:

the benefit evaluation system comprises at least one dimension of safety, comfort, passability, a right of way, a risk area, and an offset of a decision solution.

12. The method according to claim 11, wherein the benefit evaluation system further comprises a historical decision result.

13. The method according to claim 1, wherein each decision solution comprises an action pair group.

14. A non-transitory computer-readable storage medium, wherein the computer-readable storage medium stores a computer program or instructions, and when the computer program or the instructions are executed by a computing device, the computing device is enabled to perform a method comprising:

obtaining a decision solution set of an ego vehicle based on perception information;

obtaining, from the decision solution set, a first decision solution used for a first interaction phase between the ego vehicle and a game target;

while controlling the ego vehicle to travel based on the first decision solution, determining that the ego vehicle and the game target meet a condition for entering a second interaction phase;

obtaining, from the decision solution set, a second decision solution used for the second interaction phase between the ego vehicle and the game target; and controlling, based on the second decision solution, the ego vehicle to travel.

15. The computer-readable storage medium of claim 14, wherein the first interaction phase is a phase in which an interaction relationship between the ego vehicle and the game target is unclear, and the second interaction phase is a phase in which an interaction relationship between the ego vehicle and the game target is clear.

16. The computer-readable storage medium of claim 14, wherein the method further comprises:

continuously tracking a status of the game target in a process of the first interaction phase between the ego vehicle and the game target.

17. The computer-readable storage medium of claim 14, wherein the condition for entering the second interaction phase comprises one of the following:

duration of the first interaction phase exceeds threshold duration;

a decision benefit difference between a decision solution with a relatively highest decision benefit in the decision solution set and any other decision solution in the decision solution set is not less than a threshold benefit difference;

an actual moving track of the game target at a predetermined moment is inconsistent with the first decision solution;

an actual moving track of the game target at a predetermined moment is consistent with the first decision solution; or a distance between the ego vehicle and the game target is less than a threshold distance.

18. The computer-readable storage medium of claim 14, wherein the method further comprises:

determining at least one target based on the perception information;

obtaining a future moving track of the at least one target;

obtaining a future moving track of the ego vehicle; and determining a target from the at least one determined target, whose future moving track intersects the future moving track of the ego vehicle as the game target.

19. The computer-readable storage medium of claim 14, wherein the obtaining a decision solution set of an ego vehicle based on perception information comprises:

obtaining lateral position offset sampling dimensions and longitudinal acceleration sampling dimensions of the ego vehicle and the game target based on the perception information; and obtaining the decision solution set based on the lateral position offset sampling dimensions and the longitudinal acceleration sampling dimensions.

20. A vehicle, comprising:

at least one processor;

one or more memories coupled to the at least one processor and storing programming instructions for execution by the at least one processor to:

obtain perception information;

obtain a decision solution set of an ego vehicle based on the obtained perception information;

obtain, from the decision solution set, a first decision solution used for a first interaction phase between the ego vehicle and a game target;

while controlling the ego vehicle to travel based on the first decision solution, detect that the ego vehicle and the game target meet a condition for entering a second interaction phase;

obtain, from the decision solution set, a second decision solution used for a second interaction phase between the ego vehicle and the game target; and control, based on the second decision solution, the ego vehicle to travel.

* * * * *